United States Patent
Goel et al.

(10) Patent No.: US 11,948,580 B2
(45) Date of Patent: Apr. 2, 2024

(54) COLLABORATIVE RANKING OF INTERPRETATIONS OF SPOKEN UTTERANCES

(71) Applicant: GOOGLE LLC, Mountain View, CA (US)

(72) Inventors: Akshay Goel, Seattle, WA (US); Nitin Khandelwal, Sunnyvale, CA (US); Richard Park, Mountain View, CA (US); Brian Chatham, Mountain View, CA (US); Jonathan Eccles, Mountain View, CA (US); David Sanchez, Mountain View, CA (US); Dmytro Lapchuk, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 316 days.

(21) Appl. No.: 17/537,104

(22) Filed: Nov. 29, 2021

(65) Prior Publication Data
US 2023/0062201 A1    Mar. 2, 2023

Related U.S. Application Data

(60) Provisional application No. 63/238,592, filed on Aug. 30, 2021.

(51) Int. Cl.
*G10L 15/32*    (2013.01)
*G10L 15/18*    (2013.01)
(Continued)

(52) U.S. Cl.
CPC .............. *G10L 15/32* (2013.01); *G10L 15/18* (2013.01); *G10L 15/22* (2013.01); *G10L 15/30* (2013.01)

(58) Field of Classification Search
CPC ......... G10L 15/32; G10L 15/18; G10L 15/22; G10L 15/30; G10L 15/1822;
(Continued)

(56) References Cited

U.S. PATENT DOCUMENTS 10,515,625 B1 * 12/2019 Metallinou ............. G10L 15/26
2018/0096283 A1 *  4/2018 Wang ............. G06Q 10/063112
(Continued)

OTHER PUBLICATIONS

European Patent Office; International Search Report and Written Opinion issued in Application No. PCT/US2021/061463; 13 pages; dated Jun. 2, 2022.
(Continued)

*Primary Examiner* — Yogeshkumar Patel
(74) *Attorney, Agent, or Firm* — Gray Ice Higdon

(57) ABSTRACT

Implementations described herein are directed to enabling collaborative ranking of interpretations of spoken utterances based on data that is available to an automated assistant and third-party agent(s), respectively. The automated assistant can determine first-party interpretation(s) of a spoken utterance provided by a user, and can cause the third-party agent(s) to determine third-party interpretation(s) of the spoken utterance provided by the user. In some implementations, the automated assistant can select a given interpretation, from the first-party interpretation(s) and the third-party interpretation(s), of the spoken utterance, and can cause a given third-party agent to satisfy the spoken utterance based on the given interpretation. In additional or alternative implementations, an independent third-party agent can obtain the first-party interpretation(s) and the third-party interpretation(s), select the given interpretation, and then transmit the given interpretation to the automated assistant and/or the given third-party agent.

20 Claims, 6 Drawing Sheets

(51) Int. Cl.
*G10L 15/22* (2006.01)
*G10L 15/30* (2013.01)

(58) Field of Classification Search
CPC ..... G10L 15/1815; G10L 15/16; G10L 15/02;
G10L 15/08; G06F 40/216; G06F 40/30;
G06F 40/35; G06F 40/56
See application file for complete search history.

(56) References Cited

U.S. PATENT DOCUMENTS

| | | |
|---|---|---|
| 2019/0019112 A1 | 1/2019 | Gelfenbeyn et al. |
| 2019/0361729 A1 | 11/2019 | Gruber et al. |
| 2020/0143812 A1 | 5/2020 | Walker, II et al. |
| 2020/0251098 A1* | 8/2020 | Metallinou ............. G10L 15/26 |
| 2021/0065693 A1* | 3/2021 | Sharifi .................... G06F 3/167 |
| 2021/0118440 A1* | 4/2021 | Peng ..................... G06F 40/284 |

OTHER PUBLICATIONS

European Patent Office; Intention to Grant issued in Application No. 21841049.6; 65 pages; dated Oct. 26, 2023.

* cited by examiner

400

```
┌─────────────────────────────────────────────────────────────────────┐
│ DETERMINE 1P INTERPRETATION(S) OF A SPOKEN UTTERANCE THAT IS DIRECTED TO │◄─┐
│                    AN AUTOMATED ASSISTANT 452                        │  │
└─────────────────────────────────────────────────────────────────────┘  │
                                  ▼                                      │
┌─────────────────────────────────────────────────────────────────────┐  │
│ DETERMINE 3P INTERPRETATION(S) OF THE SPOKEN UTTERANCE THAT IS DIRECTED │  │
│                   TO THE AUTOMATED ASSISTANT 454                     │  │
└─────────────────────────────────────────────────────────────────────┘  │
                                  ▼                                      │
┌─────────────────────────────────────────────────────────────────────┐  │
│ SELECT A GIVEN INTERPRETATION OF THE SPOKEN UTTERANCE FROM AMONG THE │  │
│        1P INTERPRETATION(S) AND THE 3P INTERPRETATION(S) 456         │  │
└─────────────────────────────────────────────────────────────────────┘  │
                                  ▼                                      │
┌─────────────────────────────────────────────────────────────────────┐  │
│ GENERATE TRAINING INSTANCE(S) TO BE UTILIZED IN UPDATING A ML MODEL THAT │  │
│ IS TRAINED TO SELECT GIVEN INTERPRETATIONS FOR SPOKEN UTTERANCES BASED │  │
│  ON AT LEAST THE 1P INTERPRETATION(S) AND THE 3P INTERPRETATION(S) 458 │  │
│  ┌───────────────────────────────────────────────────────────────┐  │  │
│  │  LABEL THE 1P INTERPRETATION(S) AND THE 3P INTERPRETATION(S) 458A │  │  │
│  └───────────────────────────────────────────────────────────────┘  │  │
│  ┌───────────────────────────────────────────────────────────────┐  │  │
│  │    STORE THE TRAINING INSTANCE(S) IN TRAINING DATABASE(S) 458B   │  │  │
│  └───────────────────────────────────────────────────────────────┘  │  │
└─────────────────────────────────────────────────────────────────────┘  │
                                  ▼                                      │
                             ◇ TRAIN? ◇────NO──────────────────────────┘
                                460
                                  │YES
                                  ▼
┌─────────────────────────────────────────────────────────────────────┐
│ APPLY, FOR A GIVEN TRAINING INSTANCE OF THE TRAINING INSTANCE(S), AT LEAST │
│ THE 1P INTERPRETATION(S) AND THE 3P INTERPRETATION(S) AS INPUT ACROSS THE │
│         ML MODEL TO GENERATE PREDICTED OUTPUT(S) 462                 │
└─────────────────────────────────────────────────────────────────────┘
                                  ▼
┌─────────────────────────────────────────────────────────────────────┐
│ COMPARE THE PREDICTED OUTPUT(S) TO GROUND TRUTH OUTPUT(S) TO GENERATE │
│                           LOSS(ES) 464                               │
└─────────────────────────────────────────────────────────────────────┘
                                  ▼
┌─────────────────────────────────────────────────────────────────────┐
│        CAUSE THE ML MODEL TO BE UPDATED BASED ON THE LOSS(ES) 466    │
└─────────────────────────────────────────────────────────────────────┘
```

FIG. 4

COLLABORATIVE RANKING OF INTERPRETATIONS OF SPOKEN UTTERANCES

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). Automated assistants typically rely upon a pipeline of components in interpreting and responding to spoken utterances and/or other user inputs (e.g., typed input, touch input, etc.). For example, an automatic speech recognition (ASR) engine can process audio data that correspond to a spoken utterance of a user to generate ASR output, such as speech hypotheses (i.e., sequence of term(s) and/or other token(s)) of the spoken utterance. Further, a natural language understanding (NLU) engine can process the ASR output (or touch/typed input) to generate NLU output, such as one or more predicted intents expressed by the user in providing the spoken utterance (and/or other user inputs) and optionally slot value(s) for parameter(s) associated with each of the one or more predicted intents. Moreover, a fulfillment engine can be used to process the NLU output, and to generate one or more structured requests to be transmitted to various fulfillers for obtain fulfillment output, such as content to be provided for presentation to the user responsive to the spoken utterance and/or an action to be performed by the automated assistant or another computing device responsive to the spoken utterance.

Generally, an automated assistant determines multiple interpretations of a spoken utterance and/or other user input based on the NLU output and/or the fulfillment output, and selects a given interpretation of the spoken utterance and/or other user input that is predicted to be responsive to the spoken utterance. For example, assume a user provides a spoken utterance of "Assistant, play Crazy using Example Music Streaming Platform". In this example, the automated assistant can generate NLU output that includes at least a predicted music playback intent having a slot value of "Crazy" for a song parameter to be played using "Example Music Streaming Platform". Notably, in providing the spoken utterance, the user did not specify any slot value for an artist parameter. As a result, the automated assistant may infer various artist slot values for the artist parameter to determine multiple interpretations of the spoken utterance. For instance, a first interpretation can include the predicted music playback intent having the slot value of "Crazy" for the song parameter and a slot value of "Artist 1" for the artist parameter; a second interpretation can include the predicted music playback intent having the slot value of "Crazy" for the song parameter and a slot value of "Artist 2" for the artist parameter; a third interpretation can include the predicted music playback intent having the slot value of "Crazy" for the song parameter and a slot value of "Artist 3" for the artist parameter; and so on. The automated assistant may select one of the multiple interpretations, and cause the song "Crazy" by, for example, "Artist 1" to be played back in response to receiving the spoken utterance.

However, in determining the multiple interpretations and selecting one of the multiple interpretations, the automated assistant may not consider any data available to "Example Streaming Platform" since this data may not be available to the automated assistant due to various privacy considerations. For example, the automated assistant may not have access to data generated by "Example Streaming Platform" in instances where the user directly interacts with "Example Streaming Platform" without utilizing the automated assistant. Also, for instance, the automated assistant may not have access to data generated by "Example Streaming Platform" in instances where a particular song or a particular artist is trending across a population of users. Accordingly, the automated assistant may determine suboptimal interpretations and/or select an incorrect interpretation in response to receiving the spoken utterance. As a result, the user may be required to resubmit the spoken utterance to the automated assistant (and optionally including more specific slot values) and/or manually interact with "Example Streaming Platform", thereby increasing a quantity of user inputs received at the client device and prolonging a human-to-computer dialog between the user and the automated assistant. Further, the user may become frustrated not only with the automated assistant, but also with "Example Streaming Platform", thereby negatively impacting a user experience of the user during a human-to-computer dialog between the user and the automated assistant.

SUMMARY

Implementations described herein are directed to enabling collaborative ranking of interpretations of spoken utterances that are directed to an automated assistant. In some implementations, the automated assistant can process, using an automatic speech recognition (ASR) model, audio data capturing a spoken utterance that is directed to an automated assistant (e.g., executing at least in part at a client device of the user) to generate ASR output, and process, using a natural language understanding (NLU) model, the ASR output to generate NLU output. Further, the automated assistant can determine one or more first-party (1P) interpretations of the spoken utterance based on processing the NLU output. Each of the one or more 1P interpretations may be associated with a corresponding 1P predicted value that is indicative of a magnitude of confidence that each of the one or more 1P interpretations are predicted to satisfy the spoken utterance.

Moreover, the automated assistant can obtain one or more third-party (3P) interpretations of the spoken utterance determined by one or more 3P agents based on transmitting the NLU output to the one or more 3P agents over network(s), and receiving the one or more 3P interpretations. Each of the one or more 3P interpretations may be associated with a corresponding 3P predicted value that is indicative of a magnitude of confidence that each of the one or more 3P interpretations are predicted to satisfy the spoken utterance. Further, the automated assistant can select a given interpretation of the spoken utterance, based on the corresponding 1P predicted values and the corresponding 3P predicted values, from among the one or more 1P interpretations and the one or more 3P interpretations, and cause a given 3P agent, of the one or more 3P agents, to satisfy the spoken utterance based on the given interpretation of the spoken utterance.

In additional or alternative implementations, an independent 3P agent can obtain the 1P interpretations determined by the automated assistant and the 3P interpretations determined by the one or more 3P agents, and select the given interpretation of the spoken utterance. Further, the independent 3P agent can transmit the given interpretation of the spoken utterance to the automated assistant and/or the given 3P agent. Accordingly, the given interpretation of the spoken utterance can be selected collaboratively by considering both the 1P interpretations determined by the automated assistant and the 3P interpretations determined by the one or more 3P agents.

For example, assume a user provides a spoken utterance of "Assistant, play Crazy using Example Music Streaming Platform". In this example, the automated assistant can process audio data that captures the spoken utterance to generate ASR output, such as recognized text corresponding to the spoken utterance. Further, the automated assistant can process the ASR output to generate NLU output, such as a predicted music playback intent having a slot value of "Crazy" for a song parameter to be played using "Example Music Streaming Platform". Notably, in providing the spoken utterance, the user did not specify any slot value for an artist parameter despite multiple music artists likely being associated with a song entitled "Crazy". As a result, the automated assistant may infer various artist slot values for the artist parameter to determine one or more 1P interpretations of the spoken utterance and the corresponding 1P predicted values. For instance, a first 1P interpretation can include the predicted music playback intent having the slot value of "Crazy" for the song parameter and a slot value of "Artist 1" for the artist parameter and can be associated with a first 1P predicted value; a second 1P interpretation can include the predicted music playback intent having the slot value of "Crazy" for the song parameter and a slot value of "Artist 2" for the artist parameter and can be associated with a second 1P predicted value; a third 1P interpretation can include the predicted music playback intent having the slot value of "Crazy" for the song parameter and a slot value of "Artist 3" for the artist parameter and can be associated with a third 1P predicted value; and so on.

Further, the automated assistant can transmit one or more structured requests to a 3P agent associated with "Example Music Streaming Platform". The one or more structured requests transmitted to the 3P agent can be generated based on the ASR output and/or the NLU output. For instance, one or more structured requests can include the recognized text corresponding to the spoken utterance (or a portion thereof), the predicted music playback intent, the slot value of "Crazy" for the song parameter to be played using "Example Music Streaming Platform", an indication to generate the one or more 3P interpretations, and/or an indication that an artist parameter needs to be resolved. In response to receiving the one or more structured requests, the 3P agent associated with "Example Music Streaming Platform" can determine the one or more 3P interpretations and the corresponding 3P predicted values. The one or more 3P interpretations may be the same as the one or more 1P interpretations and/or include unique interpretations of the spoken utterance that differ from the one or more 1P interpretations. For instance, a first 3P interpretation can include the predicted music playback intent having the slot value of "Crazy" for the song parameter and a slot value of "Artist 4" for the artist parameter and can be associated with a first 3P predicted value; a second 3P interpretation can include the predicted music playback intent having the slot value of "Crazy" for the song parameter and the slot value of "Artist 1" for the artist parameter and can be associated with a second 3P predicted value; a third 3P interpretation can include the predicted music playback intent having the slot value of "Crazy" for the song parameter and the slot value of "Artist 2" for the artist parameter and can be associated with a third 3P predicted value; and so on.

Notably, the one or more 3P interpretations include a unique interpretation when compared to the one or more 1P interpretations (e.g., the first 3P interpretation that is associated with "Artist 4"). In some instances, the unique interpretation included in the one or more 3P interpretations can be based on one or more user interactions, of the user that provided the spoken utterance, with the 3P agent associated with "Example Music Streaming Platform" and without utilization of the automated assistant. The one or more user interactions with the 3P agent associated with "Example Music Streaming Platform" may be considered direct user interactions with the 3P agent in that the automated assistant may not be aware of the direct user interactions. For instance, the one or more user interactions can include the user manually interacting with the 3P agent associated with "Example Music Streaming Platform" to play a song entitled "Crazy" by an example artist "Artist 4". In other instances, the unique interpretation included in the one or more 3P interpretations can be based on one or more user interactions, of a group of users that exclude that the user that provided the spoken utterance, with the 3P agent associated with "Example Music Streaming Platform". For instance, the one or more user interactions can include respective users interacting with the 3P agent associated with "Example Music Streaming Platform" (and with or without utilization of a respective automated assistant) to play a song entitled "Crazy" by an example artist "Artist 4", such that the song entitled "Crazy" by the example artist "Artist 4" is trending or popular amongst the group of users. Accordingly, the one or more 3P interpretations determined by the 3P agent associated with "Example Music Streaming Platform" may be determined based on data that is not available to the automated assistant.

Moreover, the 3P agent associated with "Example Music Streaming Platform" may transmit the one or more 3P interpretations back to the automated assistant. In these implementations, the automated assistant can select a given interpretation from among the one or more 1P interpretations and the one or more 3P interpretations based on the corresponding 1P predicted values and the corresponding 3P predicted values, and cause the 3P agent associated with "Example Music Streaming Platform" to satisfy the spoken utterance based on the given interpretation of the spoken utterance. For instance, assume the automated assistant selects the first 3P interpretation including the predicted music playback intent having the slot value of "Crazy" for the song parameter and the slot value of "Artist 4" for the artist parameter. In this instance, the 3P agent associated with "Example Music Streaming Platform" can initiate streaming of a song entitled "Crazy" by an example artist "Artist 4".

Additionally, or alternatively, the automated assistant can transmit the one or more 1P interpretations to the independent 3P agent, and the 3P agent associated with "Example Music Streaming Platform" can transmit the one or more 3P interpretations to the independent 3P agent. In these implementations, the independent 3P agent can select a given interpretation from among the one or more 1P interpretations and the one or more 3P interpretations based on the corresponding 1P predicted values and the corresponding 3P predicted values. The independent 3P agent can transmit the given interpretation to the automated assistant and/or the 3P agent associated with "Example Music Streaming Platform". Put another way, the independent 3P agent can transmit the given interpretation to the automated assistant, and the automated assistant can cause the 3P agent associated with "Example Music Streaming Platform" to satisfy the spoken utterance, or the independent 3P agent can transmit the given interpretation directly to the 3P agent associated with "Example Music Streaming Platform".

Although the above example is described with respect to resolving a slot value for a parameter associated with a predicted intent, it should be understood that is for the sake of example and is not meant to be limiting. For example, assume the user instead provided a spoken utterance of "Assistant, play pretty woman" without specifying any type of streaming platform. In this example, the automated assistant can process audio data that captures the spoken utterance to generate ASR output, such as recognized text corresponding to the spoken utterance. Further, the automated assistant can process the ASR output to generate NLU output, such as a predicted music playback intent having a slot value of "pretty woman" for a song parameter and a predicted movie playback intent having a slot value of "pretty woman" for a movie parameter. Nonetheless, the automated assistant can determine one or more 1P interpretations of the spoken utterance and one or more 3P agents (e.g., a music streaming service 3P agent, a movie streaming service 3P agent, and/or other 3P agents) can determine one or more 3P interpretations in the same or similar described above. Put another way, multiple 3P agents can be utilized to generate the one or more 3P interpretations and the automated assistant and/or the independent 3P agent can consider all of the interpretations of the spoken utterance and the corresponding predicted values associated therewith in selecting the given interpretation that is utilized to satisfy the spoken utterance.

In some implementations, the corresponding 1P predicted values can include a corresponding 1P order as the magnitude of confidence that each of the 1P interpretations are predicted to satisfy the spoken utterance, and the corresponding 3P predicted values can include a corresponding 3P order as the magnitude of confidence that each of the 3P interpretations are predicted to satisfy the spoken utterance. Continuing with the above example, the automated assistant can determine an order of the one or more 1P interpretations, such as an order of the first 1P interpretation associated with "Artist 1", the second 1P interpretation associated with "Artist 2", and then the third 1P interpretation associated with "Artist 3". Further, the 3P agent associated with "Example Music Streaming Platform" can determine an order of the one or more 1P interpretations, such as an order of the first 3P interpretation associated with "Artist 4", the second 3P interpretation associated with "Artist 1", and then the third 3P interpretation associated with "Artist 2".

In these implementations, in selecting the given interpretation, the automated assistant and/or the independent 3P agent can apply one or more rules to the corresponding 1P order and the corresponding 3P order to select the given interpretation of the spoken utterance. For example, the automated assistant and/or the independent 3P agent can identify one or more heuristically-defined rules as the one or more rules based on determining that the corresponding 1P predicted values indicate the corresponding 1P order and the corresponding 3P predicted values indicate the corresponding 3P order. For instance, continuing with the above example, the one or more heuristically-defined rules can indicate that an interpretation that is highest in both the corresponding 1P order and the corresponding 3P order should be selected as the given interpretation, such as the interpretation associated with "Artist 1" since it is ordered first with respect to the one or more 1P interpretations and second with respect to the one or more 3P interpretations. Alternatively, the one or more heuristically-defined rules can indicate that an interpretation that is highest in the corresponding 3P order should be selected as the given interpretation, such as the interpretation associated with "Artist 4" since it is ordered first with respect to the one or more 3P interpretations. Although particular rules are described in the above example, it should be understood that these rules are provided for the sake of example and are not meant to be limiting.

In additional or alternative implementations, the corresponding 1P predicted values can include a corresponding 1P score, for each of the one or more 1P interpretations, as the magnitude of confidence that each of the 1P interpretations are predicted to satisfy the spoken utterance, and the corresponding 3P predicted values can include a corresponding 3P score, for each of the one or more 3P interpretations, as the magnitude of confidence that each of the 3P interpretations are predicted to satisfy the spoken utterance. Continuing with the above example, the automated assistant can determine a corresponding 1P score (e.g., a probability, a log likelihood, and/or any other predicted value to indicate the corresponding 1P score) for each of the one or more 1P interpretations, such as a first 1P score of 0.71 for the first 1P interpretation associated with "Artist 1", a second 1P score of 0.6 for the second 1P interpretation associated with "Artist 2", and a third 1P score of 0.5 for the third 1P interpretation associated with "Artist 3". The automated assistant can determine the corresponding 1P scores based on ASR measures associated with the ASR output for the spoken utterance, NLU measures associated with the NLU output for the spoken utterance, user profile data, historical interactions with the automated assistant (and optionally limited to interactions where the user utilized the automated assistant to interact with the 3P agent associated with "Example Music Streaming Platform"), and/or based on any other data accessible to the automated assistant. Further, the 3P agent associated with "Example Music Streaming Platform" can determine a corresponding 3P score (e.g., a probability, a log likelihood, and/or any other predicted value to indicate the corresponding 3P score) for each of the one or more 3P interpretations, such as a first 3P score of 0.86 for the first 3P interpretation associated with "Artist 4", a second 3P score of 0.7 for the second 3P interpretation associated with "Artist 1", and a third 3P score of 0.5 for the third 3P interpretation associated with "Artist 2". The 3P agent associated with "Example Music Streaming Platform" can determine the corresponding 3P scores based on any data that is available to the 3P agent associated with "Example Music Streaming Platform".

In these implementations, in selecting the given interpretation, the automated assistant and/or the independent 3P agent can apply one or more rules to the corresponding 1P scores and the corresponding 3P scores to select the given interpretation of the spoken utterance. For example, the automated assistant and/or the independent 3P agent can compare the corresponding 1P scores and the corresponding 3P scores to one or more score thresholds, and select the given interpretation of the spoken utterance based on comparing the corresponding 1P scores and the corresponding 3P scores to the one or more score thresholds. For instance, if a highest scored 1P interpretation is greater than 0.7 (e.g., the first 1P score of 0.71 for the first 1P interpretation associated with "Artist 1"), then the automated assistant and/or the independent 3P agent can select the highest scored 1P interpretation (e.g., the first 1P interpretation), unless a highest scored 3P interpretation is greater than 0.85 (e.g., the first 3P score of 0.86 for the first 3P interpretation associated with "Artist 4"). Accordingly, in the above example, the first 3P interpretation may be selected as the given interpretation. Also, for instance, if a highest scored 1P interpretation is between 0.5 and 0.7, then the highest scored 1P interpretation may be selected, unless a highest scored 3P interpretation is greater than the highest 1P interpretation. Also, for instance, if a highest scored 1P interpretation is lower than 0.5, then the highest scored 3P interpretation may be selected. Although particular rules and score thresholds are described in the above example, it should be understood that these rules are provided for the sake of example and are not meant to be limiting.

In additional or alternative implementations, in determining the corresponding 3P scores, the one or more 3P agents can determine "global" 3P scores that are determined based on a group or population of user and/or determine "personal" 3P scores that are personal to the user that provided the spoken utterance. For example, the 3P agent associated with "Example Music Streaming Platform" can determine the corresponding 3P scores for the different 3P interpretations based on overall popularity of the artists (e.g., indicating that "Artist 4" is the most popular artist for the song entitled "Crazy" on "Example Music Streaming Platform"), and optionally limited to a particular duration of time (e.g., indicating that "Artist 4" is the most popular artist for the song entitled "Crazy" on "Example Music Streaming Platform" over the past week, month, year, etc.). Also, for example, the 3P agent associated with "Example Music Streaming Platform" can determine the corresponding 3P scores for the different 3P interpretations based on popularity of the artist for the user that provided the spoken utterance (e.g., indicating that "Artist 1" is the most popular artist for the song entitled "Crazy" on "Example Music Streaming Platform", but the user that provided the spoken utterance prefers "Artist 4"), and optionally limited to a particular duration of time (e.g., indicating that the user has recently listened to the song entitled "Crazy" by "Artist 4" more than any other artist over the past week, month, year, etc.). In these implementations, the one or more 3P agents can transmit data characterizing the reasoning behind the "global" 3P scores and/or the "personal" 3P scores to the automated assistant and/or the independent 3P agent. For example, the 3P agent associated with "Example Music Streaming Platform" can transmit data that indicates that the first 3P interpretation associated with "Artist 4" has the highest score because "Artist 4" is the most popular artist for the song entitled "Crazy" on "Example Music Streaming Platform", because the user that provided the spoken utterance prefers "Artist 4", etc. This data can be taken into consideration by the automated assistant and/or the independent 3P agent in selecting the given interpretation of the spoken utterance.

In some implementations, the automated assistant can generate one or more training instances to be utilized in updating a machine learning (ML) model (e.g., a classification ML model, a support vector machine (SVM), a Bayesian network, and/or one or more other ML models) that is trained to select given interpretations for spoken utterances based on the one or more 1P interpretations, the corresponding 1P predicted values, the one or more 3P interpretations, and/or the corresponding 3P predicted values. For example, the automated assistant can label the given interpretation of the spoken utterance that was selected with a positive training label, and can label one or more of the 1P interpretations and one or more of the 3P interpretations that were not selected with a corresponding negative training label. In this example, the automated assistant may only label the given interpretation with the positive training label in response to determining that one or more user satisfaction criteria are satisfied. The one or more user satisfaction criteria can be determined based on user engagement with content subsequent to causing a given 3P agent to satisfy the spoken utterance based on the given interpretation, explicit feedback requested from the user that provided the spoken utterance (e.g., visually and/or audibly via a client device of the user that provided the spoken utterance), and/or other user satisfaction criteria. For instance, in the above example, the automated assistant may only label the given interpretation with the positive training label in response to determining that the user listened to the song entitled "Crazy" by the selected artist for a threshold duration of time, that the volume of the song entitled "Crazy" for the song playback exceeds a volume threshold, and/or the user provided explicit feedback that indicates the song entitled "Crazy" by the selected artist was the correct interpretation, and/or based on other signals. The automated assistant can store the one or more training instances in one or more databases for subsequent utilization in training the ML model.

In some versions of those implementations, in training the ML model, the automated assistant can apply the one or more 1P interpretations, the corresponding 1P predicted values, the one or more 3P interpretations, the corresponding 3P predicted values, an indication that data that is available to the one or more 3P agents, but that is not available to the automated assistant, was utilized in generating the one or more 3P interpretations, and/or an indication of one or more intents and/or one or more corresponding parameters associated with the one or more intents as input across the ML model to generate predicted output. The predicted output can include, for example, a single interpretation that is predicted for the spoken utterance, a distribution of values (e.g., binary values, probabilities, log likelihoods, and/or other values) for each of the one or more 1P interpretations and the one or more 3P interpretations, and/or other predicted output. The predicted outputs can be compared to the positive training label (or a value associated therewith) and the corresponding negative training labels (or corresponding values associated therewith) to generate one or more losses, and the ML model can be updated based on the one or more losses (e.g., via backpropagation). Although only a single ML model is described herein, it should be understood that is for the sake of example and is not meant to be limiting. For example, a corresponding ML model can be trained for each 3P agent that the automated assistant interacts with (e.g., a single ML model that is specific to the 3P agent associated with "Example Music Streaming Platform", etc.), or a single ML model can be trained for a group of 3P agents that the automated assistant interacts with (e.g., a single ML model that is specific to the 3P agent associated with "Example Music Streaming Platform" and other music streaming services, etc.).

In some versions of those implementations, the automated assistant and/or the independent 3P agent can subsequently utilize the ML model in selecting the given interpretation (e.g., in lieu of the one or more rules described above or in addition to the one or more rules described above). For example, the automated assistant can determine the one or more 1P interpretations and the corresponding 1P predicted values, and the one or more 3P agents can determine the one or more 3P interpretations and the corresponding 3P predicted values. Further, the automated assistant and/or the independent 3P agent can apply, as input across the ML model, at least the one or more 1P interpretations, the corresponding 1P predicted values, the one or more 3P interpretations, the corresponding 3P predicted values to generate predicted output. Moreover, the automated assistant and/or the independent 3P agent can select the given interpretation based on the predicted output.

In some implementations, and prior to generating the one or more structured requests to be transmitted to the one or more 3P agents, the automated assistant may determine whether one or more 3P agent criteria identification are satisfied. The one or more 3P agents capable of satisfying the spoken utterance may be identified in response to determining that the one or more third-party identification criteria are satisfied. The one or more 3P identification criteria include one or more of: one or more ASR measures determined in generating the ASR output, one or more NLU measures determined in generating the NLU output, one or more 3P capability measures indicative of a magnitude of confidence that the given 3P agent can satisfy the spoken utterance, one or more predicted latency measures associated with obtaining the one or more 3P interpretations of the spoken utterance, or one or more of the corresponding 1P predicted values indicative as the magnitude of confidence that one of the 1P interpretations is predicted to satisfy the spoken utterance. For example, assume that the user instead provided a spoken utterance of "Assistant, play Crazy by Artist 1 using Example Music Streaming Platform". In this example, the automated assistant may not generate any structured requests to be transmitted to any 3P agents requesting the one or more 3P interpretations assuming the automated assistant is highly confident in the ASR output and the NLU output since there are no missing slot values, and since requesting the one or more 3P interpretations will prolong a duration of the human-to-computer dialog. As another example, assume that the user instead provided a spoken utterance of "Assistant, play rock music using Example Music Streaming Platform". In this example, the automated assistant may not generate any structured requests to be transmitted to any 3P agents requesting the one or more 3P interpretations assuming the automated assistant is highly confident in the ASR output and the NLU output since the type of request provided by the user does not request a particular song or artist, and since requesting the one or more 3P interpretations will similarly prolong a duration of the human-to-computer dialog.

In some implementations, the automated assistant can analyze the ASR output and/or the NLU output in identifying the one or more 3P agents that are capable of satisfying the spoken utterance. For example, in providing the spoken utterance of "Assistant, play Crazy using Example Music Streaming Platform", the user has explicitly stated that the user would like to use "Example Music Streaming Platform". Accordingly, in this example, the automated assistant can utilize the ASR output and/or the NLU output to identify the 3P agent associated with "Example Music Streaming Platform", and transmit the one or more structured requests to the 3P agent associated with "Example Music Streaming Platform" to obtain the one or more 3P interpretations. In additional or alternative implementations, the automated assistant can maintain a list of capabilities of various 3P agents that can be utilized in identifying the one or more 3P agents that are capable of satisfying the spoken utterance. For example, assume that the user instead provided a spoken utterance of "Assistant, play Crazy by Artist 1". In this example, the automated assistant can access the list of capabilities of the various 3P agents to identify one or more 3P agents that are capable of satisfying a predicted music playback intent. Accordingly, in this example, the automated assistant can utilize the list of capabilities of the various 3P agents to identify the one or more 3P agents capable of satisfying the predicted music playback intent, and transmit the one or more structured requests to the one or more 3P agents to obtain the one or more 3P interpretations. In additional or alternative implementations, the automated assistant can poll various 3P agents in response to receiving the spoken utterance to identify the one or more 3P agents that are capable of satisfying the spoken utterance. For example, assume that the user again provided a spoken utterance of "Assistant, play Crazy by Artist 1". In this example, the automated assistant can transmit one or more structured requests to the various 3P agents that requests the various 3P agents to provide any indication of whether it is capable of satisfying a predicted music playback intent. Accordingly, in this example, the automated assistant can identify the one or more 3P agents capable of satisfying the predicted music playback intent based on the polling of the various 3P agents, and transmit the one or more structured requests to the one or more 3P agents to obtain the one or more 3P interpretations.

In some implementations, the automated assistant can determine whether the given interpretation that is selected is one of the one or more 1P interpretations or one of the one or more 3P interpretations. The automated assistant can cause an indication that the given interpretation that is selected is one of the one or more 1P interpretations or one of the one or more 3P interpretations to be provided for presentation to the user. For example, the indication can be provided for visual presentation to the user via a display of a client device of the user that provided the spoken utterance and/or can be provided for audible presentation to the user via one or more speakers of a client device of the user that provided the spoken utterance. In implementations where the given interpretation that is selected is one of the one or more 3P interpretations and the indication is provided for audible presentation to the user, the automated assistant can audibly render the indication in a synthesized voice that is reserved for 3P agents (e.g., and may be specific to the given 3P agent associated with the given interpretation), and that is distinct from an automated assistant voice reserved for the automated assistant. Put another way, if a 1P interpretation is selected as the given interpretation, any audible indication provided for presentation to the user can be provided in the automated assistant voice, but if a 3P interpretation is selected as the given interpretation, any audible indication provided for presentation to the user can be provided in the synthesized voice that is reserved for 3P agents such that the user can distinguish between the voices.

In implementations where the independent 3P agent obtains the 1P interpretations determined by the automated assistant and the 3P interpretations determined by the one or more 3P agents and selects the given interpretation of the spoken utterance, the independent 3P agent can transmit the given interpretation of the spoken utterance to the automated assistant or a given 3P agent of the one or more 3P agents. In these implementations, transmitting the given interpretation of the spoken utterance to the automated assistant can cause the automated assistant to cause the given 3P agent to satisfy the spoken utterance based on the given interpretation of the spoken utterance. Further, transmitting the given interpretation of the spoken utterance to the given 3P agent can cause the given 3P agent to satisfy the spoken utterance based on the given interpretation of the spoken utterance. In these implementations, the independent 3P agent can determine whether to transmit the given interpretation of the spoken utterance to the automated assistant or the given 3P agent based on one or more predicted latency measures associated with transmitting the given interpretation of the spoken utterance to the automated assistant. For example, if the independent 3P agent determines that one or more predicted latency measures associated with transmitting the given interpretation of the spoken utterance to the automated assistant satisfy a latency threshold, then the independent 3P agent may transmit the given interpretation directly to the given 3P agent and without transmitting the given interpretation directly to the automated assistant. However, if the independent 3P agent determines that one or more predicted latency measures associated with transmitting the given interpretation of the spoken utterance to the automated assistant do not satisfy a latency threshold, then the independent 3P agent may transmit the given interpretation to the automated assistant.

By using the techniques described herein, one or more technical advantages can be achieved. As one non-limiting example, the techniques described herein enable the automated assistant and 3P agent(s) to collaboratively rank interpretations of spoken utterances based on data that is available to the automated assistant and 3P agent(s), respectively. Accordingly, the sharing of user data between the automated assistant and the 3P agent(s) can be reduced or obviated, thereby resulting in increased security of users' data. Further, the given interpretation of the spoken utterance that is selected is more likely to align with the intent of the user in providing the spoken utterance. As a result, obviating the need for the user to provide additional spoken utterances or directly interact with the 3P agent(s) can be obviated by reducing a quantity of user inputs and concluding the human-to-computer dialog in a more quick and efficient manner, thereby conserving computational and/or network resources. Moreover, in implementations that utilize the independent 3P agent, latency in selecting the given interpretation of the spoken utterance can be reduced, especially in scenarios where the given interpretation is transmitted directly to a given 3P agent, thereby concluding the human-to-computer dialog in a more quick and efficient manner and conserving computational and/or network resources.

In some implementations, the term "first-party (1P) agent" may refer to a computational agent or system that is developed and/or maintained by the same entity that develops and/or maintains the automated assistant described herein. In some implementations, the term "third-party (3P) agent" may refer to a computational agent or system that is developed and/or maintained by an entity that is different from the entity that develops and/or maintains the automated assistant described herein. In additional or alternative implementations, the term "third-party (3P) agent" refers to any computational agent or system that is developed and/or maintained by the same entity that develops and/or maintains the automated assistant described herein, but that is distinct from the automated assistant (e.g., computationally distinct). In some implementations, the term "independent third-party (3P) agent" may refer to a computational agent or system that is developed and/or maintained by an entity that is different from the entity that develops and/or maintains the automated assistant described herein, and that is different from an entity associated with a third-party agent that generated third-party interpretations of a spoken utterance.

Each of the agents described herein (e.g., 1P agent(s), 3P agent(s), independent 3P agent(s), and/or any other agent described herein) may include at least memory, processor(s) to execute instructions stored in the memory, and one or more of network interface(s) to receive and/or transmit data over wired or wireless local area network(s) ("LANs," including Wi-Fi LANs, mesh networks, Bluetooth, near-field communication, etc.) and/or wide area network(s) ("WANs", including the Internet) and/or application programming interface(s). Further, each of the agents described herein can be implemented locally at a client device or remotely from a client device (e.g., at remote server(s)).

The above description is provided as an overview of only some implementations disclosed herein. Those implementations, and other implementations, are described in additional detail herein.

It should be understood that techniques disclosed herein can be implemented locally on a client device, remotely by server(s) connected to the client device via one or more networks, and/or both.

BRIEF DESCRIPTION OF THE DRAWINGS

FIG. 4 depicts a flowchart illustrating an example method of an automated assistant generating training instance(s) for use in training a machine learning model to be utilized in collaborative ranking of first-party interpretation(s) of a spoken utterance and third-party interpretation(s) of the spoken utterance, in accordance with various implementations.

DETAILED DESCRIPTION

Figure 1:
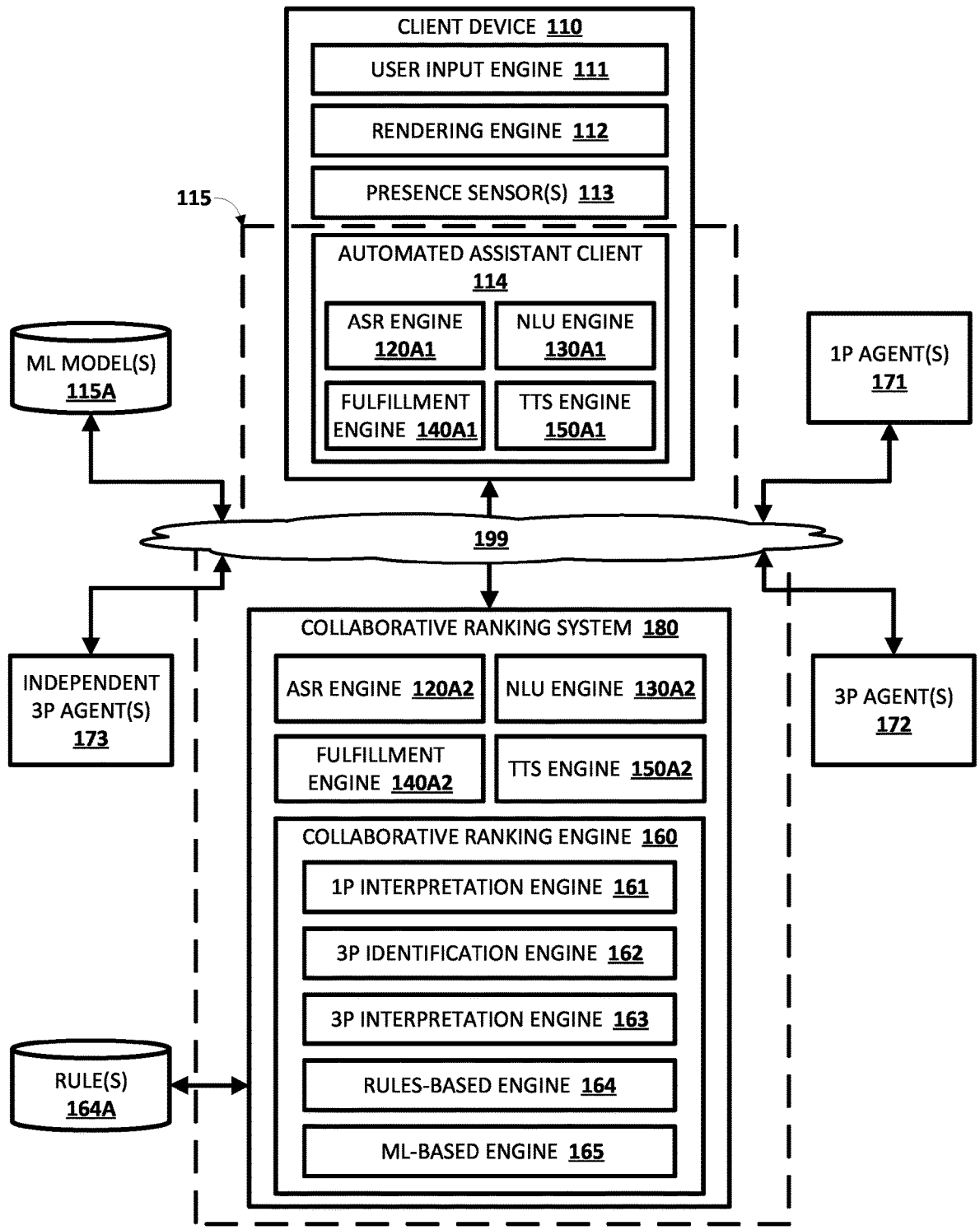
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a collaborative ranking system 180. In some implementations, the collaborative ranking system 180 can be implemented locally at the client device 110. In additional or alternative implementations, the collaborative ranking system 180 can be implemented remotely from the client device 110 as depicted in FIG. 1. In these implementations, the client device 110 and the collaborative ranking system 180 may be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an automated assistant client 114. An instance of the automated assistant client 114 can be an application that is separate from an operating system of the client device 110 (e.g., installed "on top" of the operating system)—or can alternatively be implemented directly by the operating system of the client device 110. The automated assistant client 114 can interact with the collaborative ranking system 180 implemented locally at the client device 110 or remotely via one or more of the networks 199 as depicted in FIG. 1. The automated assistant client 114 (and optionally by way of its interactions with other remote system (e.g., server(s))) may form what appears to be, from a user's perspective, a logical instance of an automated assistant 115 with which the user may engage in a human-to-computer dialog. An instance of the automated assistant 115 is depicted in FIG. 1, and is encompassed by a dashed line that includes the automated assistant client 114 of the client device 110 and the collaborative ranking system 180. It thus should be understood that a user that engages with the automated assistant client 114 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 114 executing locally on the client device 110 and/or one or more remote servers that may implement the collaborative ranking system 180.

In various implementations, the client device 110 may include a user input engine 111 that is configured to detect user input provided by a user of the client device 110 using one or more user interface input devices. For example, the client device 110 may be equipped with one or more microphones that capture audio data, such as audio data corresponding to spoken utterances of the user or other sounds in an environment of the client device 110. Additionally, or alternatively, the client device 110 may be equipped with one or more vision components that are configured to capture vision data corresponding to images and/or movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

In various implementations, the client device 110 may include a rendering engine 112 that is configured to provide content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or projector that enables content to be provided for visual presentation to the user via the client device 110.

In various implementations, the client device 110 may include one or more presence sensors 113 that are configured to provide, with approval from corresponding user(s), signals indicative of detected presence, particularly human presence. In some of those implementations, the automated assistant 115 can identify the client device 110 (or another computing device associated with a user of the client device 110) to satisfy a spoken utterance based at least in part of presence of the user at the client device 110 (or at another computing device associated with the user of the client device 110). The spoken utterance can be satisfied by rendering responsive content (e.g., via the rendering engine 112) at the client device 110 and/or other computing device(s) associated with the user of the client device 110, by causing the client device 110 and/or other computing device(s) associated with the user of the client device 110 to be controlled, and/or by causing the client device 110 and/or other computing device(s) associated with the user of the client device 110 to perform any other action to satisfy the spoken utterance. As described herein, the automated assistant 115 can leverage data determined based on the presence sensors 113 in determining the client device 110 (or other computing device(s)) to be utilized in satisfying the spoken utterance based on where a user is near or was recently near, and provide corresponding commands to only the client device 110 (or those other computing device(s)). In some additional or alternative implementations, the automated assistant 115 can leverage data determined based on the presence sensors 113 in determining whether any user(s) (any users or specific users) are currently proximal to the client device 110 (or other computing device(s)), and can optionally suppress provision of data to and/or from the client device 110 (or other computing device(s)) based on the user(s) that are proximal to the client device 110 (or other computing device(s)).

The presence sensors 113 may come in various forms. For example, the client device 110 can utilize one or more of the user interface input components described above with respect to the user input engine 111 to detect presence of the user. Additionally, or alternatively, the client device 110 may be equipped with other types of light-based presence sensors 113, such as passive infrared ("PIR") sensors that measure infrared ("IR") light radiating from objects within their fields of view.

Additionally, or alternatively, in some implementations, the presence sensors 113 may be configured to detect other phenomena associated with human presence or device presence. For example, in some embodiments, the client device 110 may be equipped with a presence sensor 113 that detects various types of wireless signals (e.g., waves such as radio, ultrasonic, electromagnetic, etc.) emitted by, for instance, other computing devices carried/operated by a user (e.g., a mobile device, a wearable computing device, etc.) and/or other computing devices. For example, the client device 110 may be configured to emit waves that are imperceptible to humans, such as ultrasonic waves or infrared waves, that may be detected by other computing device(s) (e.g., via ultrasonic/infrared receivers such as ultrasonic-capable microphones).

Additionally, or alternatively, the client device 110 may emit other types of human-imperceptible waves, such as radio waves (e.g., Wi-Fi, Bluetooth, cellular, etc.) that may be detected by other computing device(s) carried/operated by a user (e.g., a mobile device, a wearable computing device, etc.) and used to determine the user's particular location. In some implementations, GPS and/or Wi-Fi triangulation may be used to detect a person's location, e.g., based on GPS and/or Wi-Fi signals to/from the client device 110. In other implementations, other wireless signal characteristics, such as time-of-flight, signal strength, etc., may be used by the client device 110, alone or collectively, to determine a particular person's location based on signals emitted by the other computing device(s) carried/operated by the user.

Additionally, or alternatively, in some implementations, the client device 110 may perform speaker identification (SID) to recognize a user from their voice and/or may perform face identification (FID) to recognize a user from vision data capturing his/her face. In some implementations, movement of the speaker may then be determined, e.g., by the presence sensors 113 of the client device 110 (and optionally GPS sensors, Soli chips, and/or accelerometers of the client device 110). In some implementations, based on such detected movement, a location of the user may be predicted, and this location may be assumed to be the user's location when any content to be rendered at the client device 110 and/or other computing device(s) based at least in part on proximity of the client device 110 and/or other computing device(s) to the user's location. In some implementations, the user may simply be assumed to be in the last location at which he/she engaged with the automated assistant 115, especially if not much time has passed since the last engagement.

Further, the client device 110 and/or the collaborative ranking system 180 may include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199. The operations performed by the client device 110, other computing device(s), and/or by the automated assistant 115 may be distributed across multiple computer systems. The automated assistant 115 may be implemented as, for example, computer programs running on the client device 110 and/or one or more computers in one or more locations that are coupled to each other through a network (e.g., the network(s) 199 of FIG. 1).

In some implementations, the operations performed by the automated assistant 115 may be implemented locally at the client device 110 via the automated assistant client 114. As shown in FIG. 1, the automated assistant client 114 may include an automatic speech recognition (ASR) engine 120A1, a natural language understanding (NLU) engine 130A1, a fulfillment engine 140A1, and a text-to-speech (US) engine 150A1. In some implementations, the operations performed by the automated assistant 115 may be distributed across multiple computer systems, such as when the collaborative ranking system 180 is implemented remotely from the client device 110 as depicted in FIG. 1. In these implementations, the automated assistant 115 may additionally or alternatively utilize ASR engine 120A2, NLU engine 130A2, fulfillment engine 140A2, and US engine 150A2 of the collaborative ranking system 180.

Each of these engines may be configured to perform one or more functions. For example, the ASR engine 120A1 and/or 120A2 can process, using ASR model(s) stored in machine learning (ML) model(s) database 115A (e.g., a recurrent neural network (RNN) model, a transformer model, and/or any other type of ML model capable of performing ASR), audio data that captures a spoken utterance and that is generated by microphone(s) of the client device 110 to generate ASR output. Further, the NLU engine 130A1 and/or 130A2 can process, using NLU model(s) stored in the ML model(s) database 115A (e.g., a long short-term memory (LSTM), gated recurrent unit (GRU), and/or any other type of RNN or other ML model capable of performing NLU) and/or grammar-based rule(s), the ASR output to generate NLU output. Moreover, the fulfillment engine 140A1 and/or 140A2 can generate fulfillment output(s) based on fulfillment data generated based on the stream of NLU output. The fulfillment data can be generated using, for example, the automated assistant 115, one or more first-party (1P) agents 171, and/or one or more third-party (3P) agents 171 (e.g., as described with respect to FIG. 2). Lastly, the TTS engine 150A1 and/or 150A2 can process, using TTS model(s) stored in the ML model(s) database 115A, textual data (e.g., text formulated by the automated assistant 115) to generate synthesized speech audio data that includes computer-generated synthesized speech. Notably, the ML model(s) stored in the ML model(s) database 115A can be on-device ML models that are stored locally at the client device 110 or shared ML models that are accessible to both the client device 110 and/or remote systems (e.g., server(s)).

In various implementations, the ASR output can include, for example, speech hypotheses (e.g., term hypotheses and/or transcription hypotheses) that are predicted to correspond to spoken utterance(s) of a user that are captured in the audio data, one or more corresponding predicted values (e.g., probabilities, log likelihoods, and/or other values) for each of the speech hypotheses, a plurality of phonemes that are predicted to correspond to spoken utterance(s) of a user that are captured in the audio data, and/or other ASR output. In some versions of those implementations, the ASR engine 120A1 and/or 120A2 can select one or more of the speech hypotheses as recognized text that corresponds to the spoken utterance (e.g., based on the corresponding predicted values).

In various implementations, the NLU output can include, for example, annotated recognized text that includes one or more annotations of the recognized text for one or more (e.g., all) of the terms of the recognized text. For example, the NLU engine 130A1 and/or 130A2 may include a part of speech tagger (not depicted) configured to annotate terms with their grammatical roles. Additionally, or alternatively, the NLU engine 130A1 and/or 130A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Additionally, or alternatively, the NLU engine 130A1 and/or 130A2 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 130A1 and/or 130A2 may rely on annotations from one or more other components of the NLU engine 130A1 and/or 130A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household).

In some implementations, the automated assistant 115 and/or one or more independent 3P agents 173 can utilize the collaborative ranking system 180 to collaboratively rank interpretations of a spoken utterance received at the client device 110. In particular, the automated assistant 115 and/or one or more independent 3P agents 173 can utilize a collaborative ranking engine 160 of the collaborative ranking system 180 to collaboratively rank interpretations of a spoken utterance received at the client device 110. In various implementations, and as depicted in FIG. 1, the collaborative ranking engine 160 can include a 1P interpretation engine, a 3P identification engine 162, a 3P interpretation engine 163, a rules-based engine 164, and a ML-based engine 165. Additional description with respect to how the automated assistant 115 and/or one or more independent 3P agents 173 utilize the collaborative ranking engine 150 is provided with respect to FIG. 2.

Figure 2:
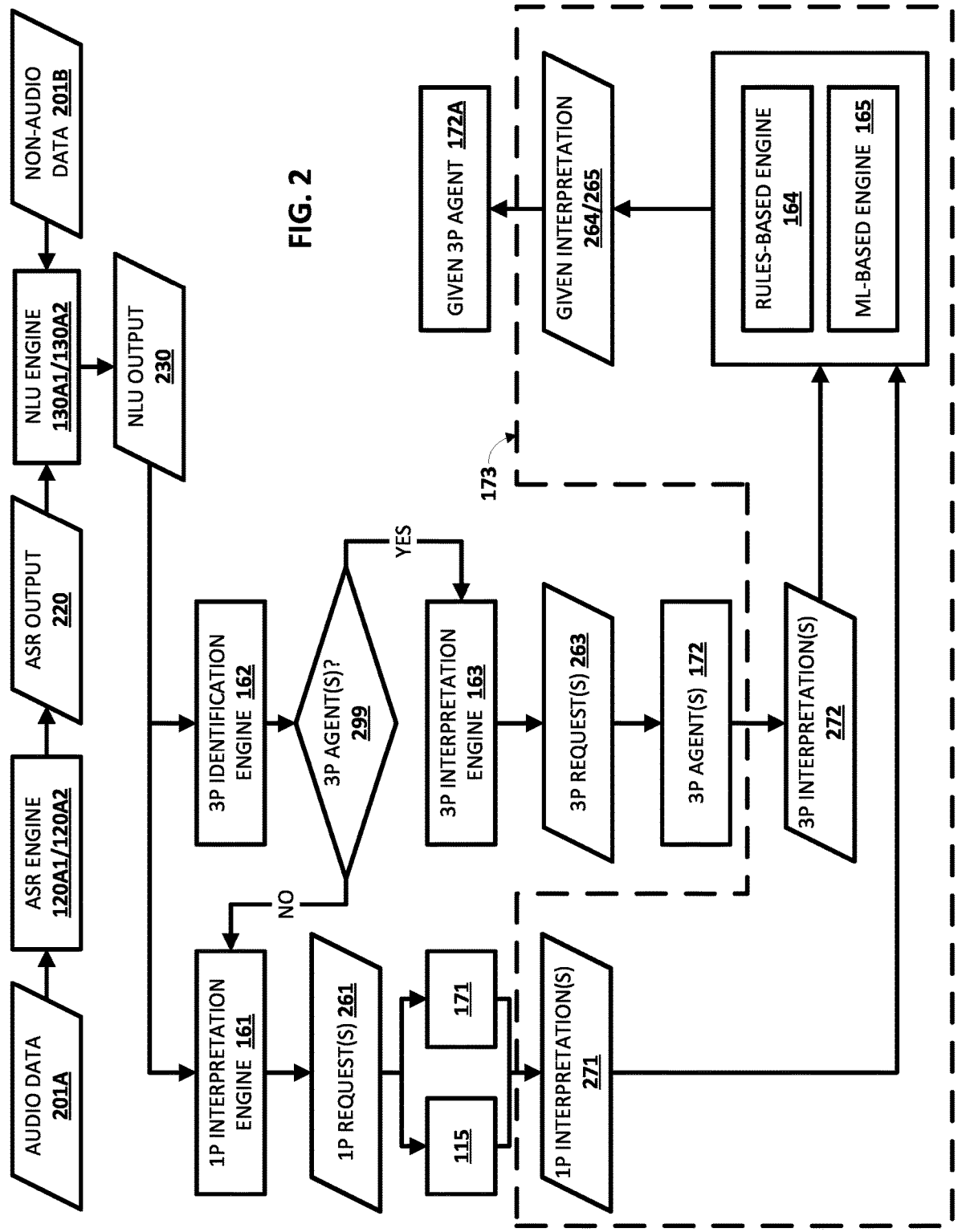
FIG. 2 depicts an example process flow that demonstrates various aspects of the present disclosure using various components of FIG. 1, in accordance with various implementations.

Turning now to FIG. 2, an example process flows that demonstrates various aspects of the present disclosure using various components of FIG. 1 is depicted. The ASR engine 120A1 and/or 120A2 can process, using an ASR model stored in the ML model(s) database 115A, audio data 201A that captures a spoken utterance to generate ASR output 220. The NLU engine 130A1 and/or 130A2 can process the ASR output 220, using an NLU model stored in the ML model(s) database 115A, to generate NLU output 230. In some implementations, the NLU engine 130A1 and/or 130A2 can additionally or alternatively process a stream of non-audio data 201B in generating the NLU output 230. The stream of non-audio data 201B can include, for example, vision data generated by vision component(s) of the client device 110, touch inputs provided by a user via a touch-sensitive display of the client device 110, typed input provided by a user via a touch-sensitive display of the client device 110 or a peripheral device (e.g., a mouse and keyboard), and/or any other non-audio data.

Further, the 1P interpretation engine 161 can process the NLU output 230 to generate one or more 1P requests 261 for one or more 1P interpretations 271 of the spoken utterance captured in the audio data 201A. The 1P interpretation engine 161 can cause the automated assistant 115 and/or one or more of the 1P agents 171 to determine one or more 1P interpretations 271 of the spoken utterance based on the one or more 1P requests 261. Each of the one or more 1P interpretations 271 determined by the automated assistant 115 and/or one or more of the 1P agents 171 can be associated with a corresponding 1P predicted value that is indicative of a magnitude of confidence that each of the one or more 1P interpretations 271 are predicted to satisfy the spoken utterance.

Moreover, the 3P identification engine 162 can determine, based on at least the NLU output 230, whether to identify one or more 3P agents to be utilized in determining one or more 3P interpretations 272 of the spoken utterance. For example, if the NLU output 230 indicates high confidence in a predicted intent and high confidence that all slot values for corresponding parameter(s) associated with the predicted intent are known, then the 3P identification engine 162 may determine not to identify the one or more 3P agents to be utilized in determining one or more 3P interpretations 272 of the spoken utterance to reduce latency in concluding the human-to-computer dialog session and since the automated assistant 115 is highly confident in the one or more 1P interpretations 271 of the spoken utterance. Assuming that the 3P identification engine 162 determines not to identify the one or more 3P agents, a determination can be made at block 299 to only consider the one or more 1P interpretations 271.

However, assuming that the 3P identification engine 162 determines to identify the one or more 3P agents, a determination can be made at block 299 to determine the one or more 3P interpretations 272. Further, the 3P identification engine 162 can identify one or more of the 3P agents 172 to which one or more 3P requests 263 can be transmitted in determining the one or more 3P interpretations 171 based on the NLU output, a list of 3P agent capabilities maintained by the automated assistant 115, and/or polling one or more of the 3P agents 172 as described herein. Moreover, the 3P interpretation engine 163 can generate one or more 3P requests 263 for one or more 3P interpretations 272 of the spoken utterance captured in the audio data 201A. The 1P interpretation engine 161 can transmit the one or more 3P requests 263 to one or more of the identified 3P agents 172 to cause one or more of the identified 3P agents 172 to determine the one or more 3P interpretations 272 of the spoken utterance based on the one or more 3P requests 263. Each of the one or more 3P interpretations 272 determined by one or more of the identified 3P agents 172 can be associated with a corresponding 3P predicted value that is indicative of a magnitude of confidence that each of the one or more 3P interpretations 272 are predicted to satisfy the spoken utterance.

Figure 3:
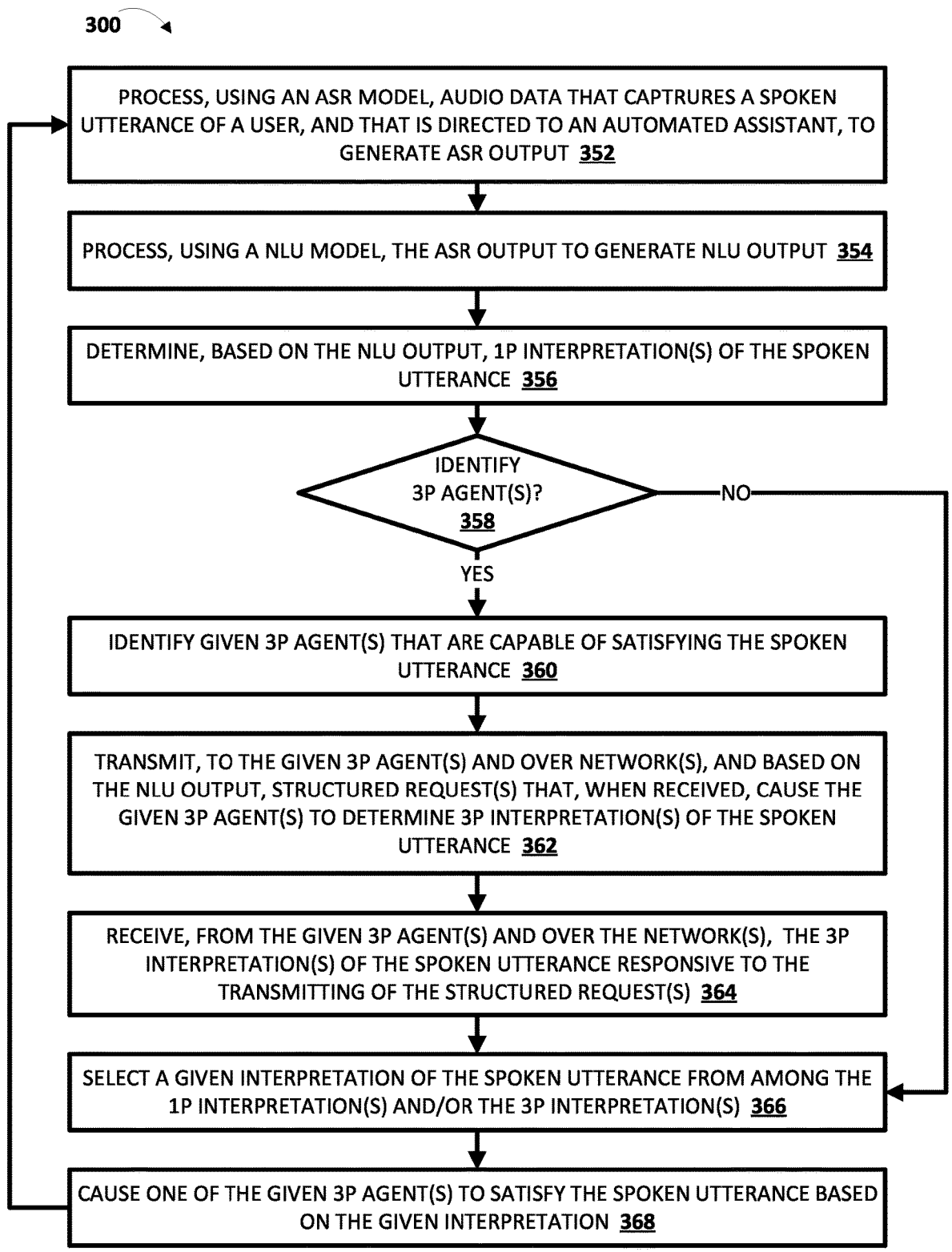
FIG. 3 depicts a flowchart illustrating an example method of an automated assistant performing collaborative ranking of first-party interpretation(s) of a spoken utterance and third-party interpretation(s) of the spoken utterance, in accordance with various implementations.

In some implementations, and as described in more detail with respect to FIG. 3, the rules-based engine 164 can process, using one or more rules stored in the rule(s) database 164A, the one or more 1P interpretations 271 and/or the one or more 3P interpretations 272 to select a given interpretation 264/265 of the spoken utterance captured in the audio data 201A. In additional or alternative implementations, and as described in more detail with respect to FIG. 3, the ML-based engine 165 can process, using a ML model stored in the ML model(s) database 115A that is trained to select given interpretations of spoken utterances (e.g., as described with respect to FIG. 4), the one or more 1P interpretations 271 and/or the one or more 3P interpretations 272 to select a given interpretation 264/265 of the spoken utterance captured in the audio data 201A. The given interpretation 264/265 can be provided to a given 3P agent 172A to cause the given 3P agent to satisfy the spoken utterance captured in the audio data 201A based on the given interpretation 264/265. Further, the given 3P agent 172A can transmit data back to the automated assistant that can be subsequently utilized in updating the ML model (e.g., data associated with user satisfaction criteria when the given 3P agent 172A satisfies the spoken utterance based on the given interpretation 254/265, a unique event identifier associated with the given 3P agent 172A satisfying the spoken utterance based on the given interpretation 254/265, etc. as described below with respect to the method 400 of FIG. 4).

In some implementations, the ML-based engine 165 can merge the one or more 1P interpretations 271 and the one or more 3P interpretations 272 into a single stream of interpretations of the spoken utterance that is captured in the stream of audio data 201A. In some versions of those implementations, the ML-based engine 165 can reconcile the stream of interpretations using one or more de-duplicating techniques to merge the one or more 1P interpretations 271 and the one or more 3P interpretations 272 into the single stream of interpretations of the spoken utterance. For instance, assume that the one or more 1P interpretations 271 and the one or more 3P interpretations 272 include a same entity for a slot value associated with a parameter to be resolved (e.g., "Artist 1" for an artist parameter). In this example, ML-based engine 165 can utilize a unique entity identifier technique, a text-based matching technique (e.g., exact matching, soft matching, etc.) to ensure the single stream of the interpretations of the spoken utterance do not include multiple instances of the same interpretation from the one or more 1P interpretations 271 and the one or more 3P interpretations 272. As a result, the ML model described herein can be subsequently trained based on the single stream of interpretations, resulting in improved accuracy and/or precision of the ML model in selecting the given interpretation 264/265.

In some implementations, the one or more 3P interpretations 272 can be transmitted from one or more of the identified 3P agents 172 to the automated assistant 115 executing at least in part at the client device 110, and the automated assistant 115 can cause the one or more 1P interpretations 271 and/or the one or more 3P interpretations 272 to be processed using the rules-based engine 164 and/or the ML-based engine 165. In additional or alternative implementations, the one or more 1P interpretations 271 and/or the one or more 3P interpretations 272 can be transmitted to one or more of the independent 3P agents 173, and one or more of the independent 3P agents 173 can cause the one or more 1P interpretations 271 and/or the one or more 3P interpretations 272 to be processed using the rules-based engine 164 and/or the ML-based engine 165 (e.g., as indicated by the dashed lines in FIG. 2, and as described in more detail with respect to FIG. 5).

Turning now to FIG. 3, a flowchart illustrating an example method 300 of an automated assistant performing collaborative ranking of first-party interpretation(s) of a spoken utterance and third-party interpretation(s) of the spoken utterance is depicted. For convenience, the operations of the method 300 are described with reference to a system that performs the operations. This system of the method 300 includes one or more processors, memory, and/or other component(s) of computing device(s) (e.g., client device 110 of FIG. 1, computing device 610 of FIG. 6, one or more servers, and/or other computing devices). Moreover, while operations of the method 300 are shown in a particular order, this is not meant to be limiting. One or more operations may be reordered, omitted, and/or added.

At block 352, the system processes, using an ASR model, audio data that captures a spoken utterance of a user, and that is directed to an automated assistant, to generate ASR output. In some implementations, the system may only process the audio data that captures the spoken utterance in response to determining that the automated assistant has been invoked via one or more particular terms or phrases (e.g., a hotword, such as "Assistant", "Hey Assistant", etc.), one or more particular gestures (e.g., speech directed to a client device executing the automated assistant at least in part at the client device, and optionally coupled with one or more other signals, such as a user gaze directed to the client device), one or more button presses (e.g., actuation of a software button or a hardware button that invokes the automated assistant), and/or when one or more other conditions are satisfied. At block 354, the system processes, using a NLU model, the ASR output to generate NLU output.

At block 356, the system determines, based on the NLU output, one or more 1P interpretations of the spoken utterance. Each of the one or more 1P interpretations may be associated with a corresponding 1P predicted value that is indicative of a magnitude of confidence that each of the one or more 1P interpretations are predicted to satisfy the spoken utterance. For example, assume a user provides a spoken utterance of "Assistant, play Crazy using Example Music Streaming Platform". In this example, a first 1P interpretation can include the predicted music playback intent having the slot value of "Crazy" for the song parameter and a slot value of "Artist 1" for the artist parameter and can be associated with a first 1P predicted value; a second 1P interpretation can include the predicted music playback intent having the slot value of "Crazy" for the song parameter and a slot value of "Artist 2" for the artist parameter and can be associated with a second 1P predicted value; a third 1P interpretation can include the predicted music playback intent having the slot value of "Crazy" for the song parameter and a slot value of "Artist 3" for the artist parameter and can be associated with a third 1P predicted value; and so on.

In some implementations, the corresponding 1P predicted values can include a corresponding 1P order as the magnitude of confidence that each of the 1P interpretations are predicted to satisfy the spoken utterance. The corresponding 1P order can be based on, for example, ASR measures and/or NLU measures that are determined in generating the ASR output and/or the NLU output. In the above example, the corresponding 1P predicted values can include a corresponding 1P order of the first 1P interpretation associated with "Artist 1", followed by the second 1P interpretation associated with "Artist 2", and followed by the third 1P interpretation associated with "Artist 3". In additional or alternative implementations, the corresponding 1P predicted values can include a corresponding 1P score, for each of the one or more 1P interpretations, as the magnitude of confidence that each of the 1P interpretations are predicted to satisfy the spoken utterance. In the above example, the corresponding 1P predicted values can include binary values, probabilities, log likelihoods, and/or any other value to represent the corresponding 1P scores, such as a first 1P score of 0.71 for the first 1P interpretation associated with "Artist 1", a second 1P score of 0.6 for the second 1P interpretation associated with "Artist 2", and a third 1P score of 0.5 for the third 1P interpretation associated with "Artist 3".

At block 358, the system determines whether to identify one or more 3P agents for determining one or more 3P interpretations of the spoken utterance. The system can determine whether to identify the one or more 3P agents based on determining whether one or more 3P agent criteria identification are satisfied. The one or more 3P identification criteria include one or more of: one or more ASR measures determined in generating the ASR output, one or more NLU measures determined in generating the NLU output, one or more 3P capability measures indicative of a magnitude of confidence that the given 3P agent can satisfy the spoken utterance, one or more predicted latency measures associated with obtaining the one or more 3P interpretations of the spoken utterance, or one or more of the corresponding 1P predicted values indicative as the magnitude of confidence that one of the 1P interpretations is predicted to satisfy the spoken utterance. Put another way, if the system determines high confidence in one or more of the 1P interpretations and/or computational resources would be wasted in determining the one or more 3P interpretations of the spoken utterance, then the system may not identify the one or more 3P agents. If, at an iteration of block 358, the system determines not to identify one or more 3P agents for generating one or more 3P interpretations of the spoken utterance, then the system may proceed to block 366. Operations of block 366 are described below. If, at an iteration of block 358, the system determines to identify one or more 3P agents for generating one or more 3P interpretations of the spoken utterance, then the system may proceed to block 360.

At block 360, the system identifies one or more given 3P agents that are capable of satisfying the spoken utterance. The system can analyze the ASR output and/or the NLU output in identifying the one or more 3P agents that are capable of satisfying the spoken utterance. For instance, in providing the spoken utterance of "Assistant, play Crazy using Example Music Streaming Platform" in the above example, the user has explicitly stated that the user would like to use "Example Music Streaming Platform". Accordingly, in this example, the automated assistant can utilize the ASR output and/or the NLU output to identify the 3P agent associated with "Example Music Streaming Platform". However, had the user not specified the 3P agent associated with "Example Music Streaming Platform" in the spoken utterance, then the system can access a list of capabilities of various 3P agents that can be utilized in identifying the one or more 3P agents that are capable of satisfying the spoken utterance and/or poll a list of capabilities of various 3P agents that can be utilized in identifying the one or more 3P agents that are capable of satisfying the spoken utterance.

At block 362, the system transmits, to the one or more given 3P agents and over one or more networks, and based on the NLU output, one or more structured requests that, when received, cause the one or more given 3P agents to determine one or more 3P interpretations of the spoken utterance. At block 364, the system receives, from the one or more given 3P agents and over the one or more networks, the one or more 3P interpretations of the spoken utterance responsive to the transmitting of the one or more structured requests. The one or more given 3P agents can, in response to receiving the one or more structured requests, determine the one or more 3P interpretations of the spoken utterance. Similar to each of the one or more 1P interpretations, each of the one or more 3P interpretations may be associated with a corresponding 3P predicted value that is indicative of a magnitude of confidence that each of the one or more 3P interpretations are predicted to satisfy the spoken utterance. Continuing with the above example, a first 3P interpretation can include the predicted music playback intent having the slot value of "Crazy" for the song parameter and a slot value of "Artist 4" for the artist parameter and can be associated with a first 3P predicted value; a second 3P interpretation can include the predicted music playback intent having the slot value of "Crazy" for the song parameter and a slot value of "Artist 3" for the artist parameter and can be associated with a second 3P predicted value; a third 3P interpretation can include the predicted music playback intent having the slot value of "Crazy" for the song parameter and a slot value of "Artist 2" for the artist parameter and can be associated with a third 3P predicted value; and so on.

Also, similarly, in some implementations, the corresponding 3P predicted values can include a corresponding 3P order as the magnitude of confidence that each of the 3P interpretations are predicted to satisfy the spoken utterance. The corresponding 3P order can be based on, for example, NLU output included in the one or more structured requests and/or data that is available to a respective one of the one or more given 3P agents, but not available to the automated assistant. In the above example, the corresponding 3P predicted values can include a corresponding 3P order of the first 3P interpretation associated with "Artist 4", followed by the second 3P interpretation associated with "Artist 1", and followed by the third 3P interpretation associated with "Artist 2". In additional or alternative implementations, the corresponding 3P predicted values can include a corresponding 3P score, for each of the one or more 3P interpretations, as the magnitude of confidence that each of the 3P interpretations are predicted to satisfy the spoken utterance. In the above example, the corresponding 3P predicted values can include binary values, probabilities, log likelihoods, and/or any other value to represent the corresponding 3P scores, such as a first 3P score of 0.86 for the first 3P interpretation associated with "Artist 4", a second 3P score of 0.7 for the second 3P interpretation associated with "Artist 1", and a third 3P score of 0.5 for the third 3P interpretation associated with "Artist 2".

At block 366, the system selects a given interpretation of the spoken utterance from among the one or more 1P interpretations and/or the one or more 3P interpretations. In implementations where system proceeds to block 366 from block 358, the system can select the given interpretation from only among the one or more 1P interpretations since no 3P interpretations of the spoken utterance are generated. However, in implementations where the system proceeds to block 366 from block 364, the system can additionally consider the one or more 3P interpretations in selecting the given interpretation.

In some implementations, the system can utilize a rules-based approach in selecting the given interpretation of the spoken utterance. For example, the system can process the one or more 1P interpretations and the one or more 3P interpretations using one or more rules. For instance, in implementations where the corresponding values include the corresponding 1P order for the one or more 1P interpretations and the corresponding 3P order for the one or more 3P interpretations, the one or more rules can indicate that an interpretation that is highest in both the corresponding 1P order and the corresponding 3P order should be selected as the given interpretation, such as the interpretation associated with "Artist 1" since it is ordered first with respect to the one or more 1P interpretations and second with respect to the one or more 3P interpretations. Additionally, or alternatively, the one or more rules can indicate that an interpretation that is highest in the corresponding 3P order should be selected as the given interpretation, such as the interpretation associated with "Artist 4" since it is ordered first with respect to the one or more 3P interpretations. Although particular rules are described in the above example, it should be understood that these rules are provided for the sake of example and are not meant to be limiting.

Also, in implementations where the corresponding values include the corresponding 1P scores and the corresponding 3P scores, the one or more rules can indicate various scoring thresholds for selecting the given interpretation of the spoken utterance. For instance, if a highest scored 1P interpretation is greater than 0.7 (e.g., the first 1P score of 0.71 for the first 1P interpretation associated with "Artist 1"), then the automated assistant and/or the independent 3P agent can select the highest scored 1P interpretation (e.g., the first 1P interpretation), unless a highest scored 3P interpretation is greater than 0.85 (e.g., the first 3P score of 0.86 for the first 3P interpretation associated with "Artist 4"). Accordingly, in the above example, the first 3P interpretation may be selected as the given interpretation. Also, for instance, if a highest scored 1P interpretation is between 0.5 and 0.7, then the highest scored 1P interpretation may be selected, unless a highest scored 3P interpretation is greater than the highest 1P interpretation. Also, for instance, if a highest scored 1P interpretation is lower than 0.5, then the highest scored 3P interpretation may be selected. Although particular rules and score thresholds are described in the above example, it should be understood that these rules are provided for the sake of example and are not meant to be limiting.

In additional or alternative implementations, the system can utilize a ML-based approach in selecting the given interpretation of the spoken utterance. For example, the system can apply, as input across a ML model (e.g., trained at least in part in the manner described with respect to the method 400 of FIG. 4), at least the one or more 1P interpretations, the corresponding 1P predicted values, the one or more 3P interpretations, the corresponding 3P predicted values to generate predicted output. Moreover, the system can select the given interpretation based on the predicted output. The predicted output can include, for example, the given interpretation of the spoken utterance, a corresponding modified score for each of the one or more 1P interpretations and the one or more 3P interpretations based on which the given interpretation can be selected, and/or other predicted output that can be utilized in selecting the given interpretation.

At block 368, the system causes one of the one or more given 3P agents to satisfy the spoken utterance based on the given interpretation. For example, the system can cause the given interpretation to be transmitted to the one of the one or more given 3P agents to satisfy the spoken utterance based on the given interpretation. In the above example, the system can cause the given interpretation to be transmitted to the 3P agent associated with "Example Music Streaming Platform" to cause the song entitled "Crazy" by the artist associated with the given interpretation to be audibly played back for presentation to the user that provided the spoken utterance.

Turning now to FIG. 4, a flowchart illustrating an example method 400 of an automated assistant generating training instance(s) for use in training a machine learning model to be utilized in collaborative ranking of first-party interpretation(s) of a spoken utterance and third-party interpretation(s) of the spoken utterance is depicted. For convenience, the operations of the method 400 are described with reference to a system that performs the operations. This system of the method 400 includes one or more processors, memory, and/or other component(s) of computing device(s) (e.g., client device 110 of FIG. 1, computing device 610 of FIG. 6, one or more servers, and/or other computing devices). Moreover, while operations of the method 400 are shown in a particular order, this is not meant to be limiting. One or more operations may be reordered, omitted, and/or added.

At block 452, the system determines one or more 1P interpretations of a spoken utterance that is directed to an automated assistant. The system may determine the one or more 1P interpretations of the spoken utterance that is directed to the automated assistant in the same or similar manner described with respect to the operations of block 352-356 of the method 300 of FIG. 3. At block 454, the system determines one or more 3P interpretations of the spoken utterance that is directed to the automated assistant. The system may determine the one or more 3P interpretations of the spoken utterance that is directed to the automated assistant in the same or similar manner described with respect to the operations of block 360-364 of the method 300 of FIG. 3 assuming that the system determines to identify one or more 3P agents. At block 456, the system selects a given interpretation of the spoken utterance from among the one or more 1P interpretations and the one or more 3P interpretations. The system can select the given interpretation of the spoken utterance from among the one or more 1P interpretations and the one or more 3P interpretations in the same or similar manner described with respect to the operations of block 366 of FIG. 3.

At block 458, the system generates one or more training instances to be utilized in updating a machine learning (ML) model that is trained to select given interpretations for spoken utterances based on at least the one or more 1P interpretations and the one or more 3P interpretations. For example, at sub-block 458A, the system labels the one or more 1P interpretations and the one or more 3P interpretations. For instance, the system can label the given interpretation of the spoken utterance that was selected with a positive training label, and can label one or more of the 1P interpretations and one or more of the 3P interpretations that were not selected with a corresponding negative training label. In this instance, the automated assistant may only label the given interpretation with the positive training label in response to determining that one or more user satisfaction criteria are satisfied. The one or more user satisfaction criteria can be determined based on user engagement with content subsequent to causing a given 3P agent to satisfy the spoken utterance based on the given interpretation, explicit feedback requested from the user that provided the spoken utterance (e.g., visually and/or audibly via a client device of the user that provided the spoken utterance), and/or other user satisfaction criteria. For instance, in the above example from FIG. 3, the automated assistant may only label the given interpretation with the positive training label in response to determining that the user listened to the song entitled "Crazy" by the selected artist for a threshold duration of time, that the volume of the song entitled "Crazy" for the song playback exceeds a volume threshold, and/or the user provided explicit feedback that indicates the song entitled "Crazy" by the selected artist was the correct interpretation, and/or based on other signals. Further, at sub-block 458B, the system stores the one or more training instances in one or more training databases. Also, for example, the given 3P agent can determine a unique event identifier for the playback of the song entitled "Crazy" that was played back based on the given interpretation of the spoken utterance. The unique event identifier can be associated with the user satisfaction criteria, and can be utilized by the system in generating the one or more training instances. For example, the unique event identifier can be utilized in determining the labels to be assigned to the one or more 1P interpretations and the one or more 3P interpretations based on the user satisfaction criteria, such as the automated assistant or the given 3P interpretation indicating the user satisfaction criteria was satisfied for [EXAMPLE UNIQUE EVENT IDENTIFIER].

At block 460, the system determines whether to train the ML model. The system can determine whether to train the ML model in response to determining one or more training criteria are satisfied. The one or more training criteria can include, for example, a time of day, a day of week, a client device at which the spoken utterance was received having a threshold state of charge, the client device currently charging, a threshold duration of time lapsing (e.g., every week, every month), and/or other training criteria for determining whether to train the ML model. Although block 460 is depicted as occurring after block 458, it should be understood that is for the sake of example and is not meant to be limiting. For example, the operations of block 460 can be performed prior to the operations of block 458, such that the system may store the one or more 1P interpretations and the one or more 3P interpretations in response to receiving the spoken utterance, but wait until the one or more training criteria are satisfied to generate the one or more training instances.

If, at an iteration of block 460, the system determines not to train the ML model, the system returns to block 452 to perform additional iterations of block 454-458 based on an additional spoken utterance that is directed to the automated assistant. Put another way, the system can continue generating one or more additional training instances based on additional spoken utterances that are received from the user. If, at an iteration of block 460, the system determines to train the ML model, the system proceeds to block 462.

At block 462, the system applies, for a given training instance of the one or more training instances, at least the one or more 1P interpretations and the one or more 3P interpretations as input across the ML model to generate one or more predicted outputs. For example, the system can apply the one or more 1P interpretations, the corresponding 1P predicted values, the one or more 3P interpretations, and the corresponding 3P predicted values as input across the ML model to generate the one or more predicted outputs. In some implementations, the system can optionally apply one or more of an indication that data that is available to the one or more 3P agents, but that is not available to the automated assistant, was utilized in generating the one or more 3P interpretations, and/or an indication of one or more intents and/or one or more corresponding parameters associated with the one or more intents as input across the ML model in generating the one or more predicted outputs. The one or more predicted outputs can include, for example, a single interpretation that is predicted for the spoken utterance, a distribution of values (e.g., binary values, probabilities, log likelihoods, and/or other values) for each of the one or more 1P interpretations and the one or more 3P interpretations, and/or other predicted outputs.

At block 464, the system compares the one or more predicted outputs to one or more ground truth outputs to generate one or more losses. At block 466, the system causes the ML model to be updated based on the one or more losses. For example, the one or more predicted outputs can be compared to the positive training label (or a value associated therewith) and/or the corresponding negative training labels (or corresponding values associated therewith) to generate one or more losses, and the ML model can be updated based on the one or more losses (e.g., via backpropagation).

Figure 5:
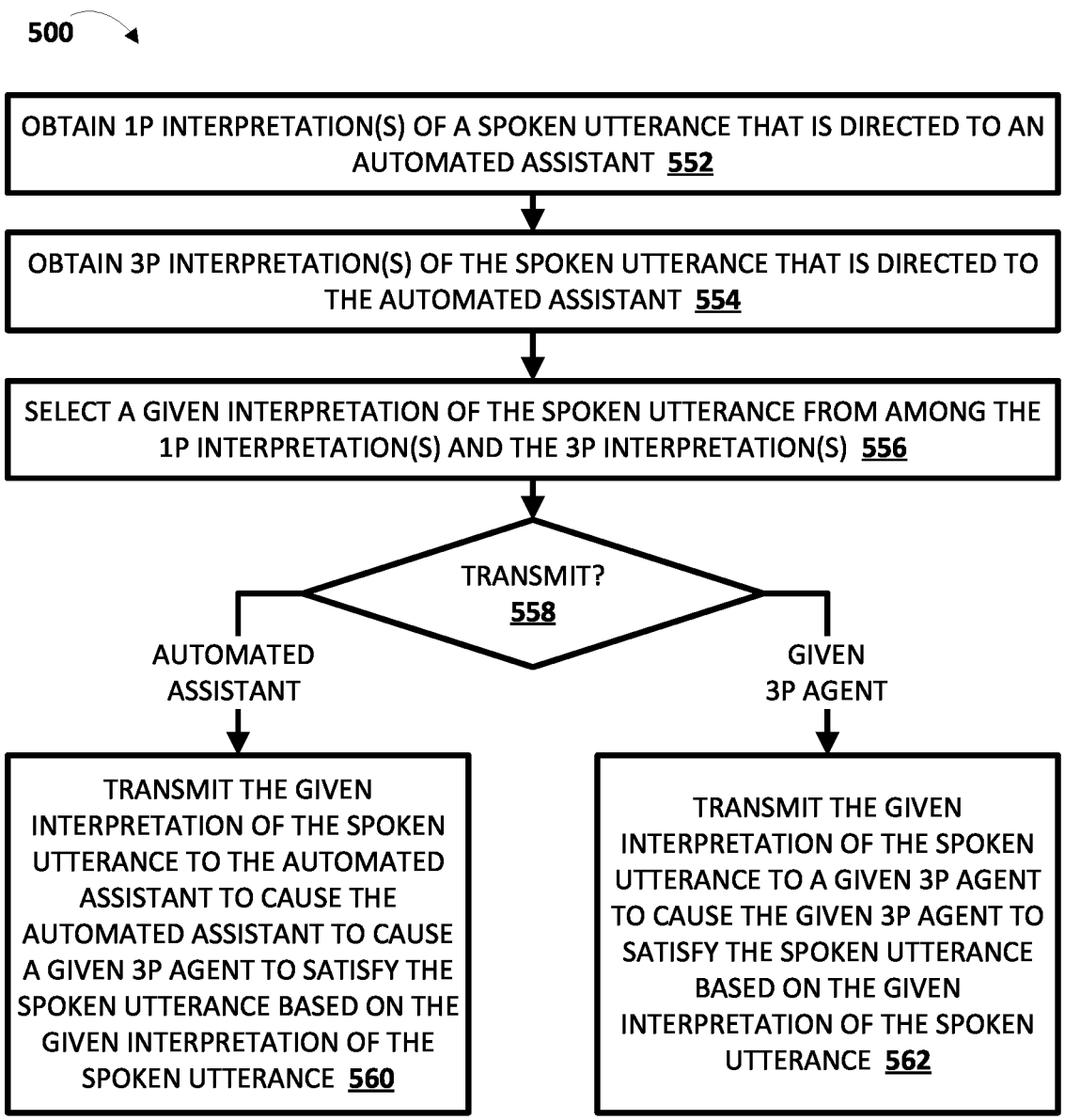
FIG. 5 depicts a flowchart illustrating an example method of an independent third-party agent performing collaborative ranking of first-party interpretation(s) of a spoken utterance and third-party interpretation(s) of the spoken utterance, in accordance with various implementations.

Turning now to FIG. 5, a flowchart illustrating an example method 400 of an independent third-party agent performing collaborative ranking of first-party interpretation(s) of a spoken utterance and third-party interpretation(s) of the spoken utterance is depicted. For convenience, the operations of the method 500 are described with reference to a system that performs the operations. This system of the method 500 includes one or more processors, memory, and/or other component(s) of computing device(s) (e.g., client device 110 of FIG. 1, computing device 610 of FIG. 6, one or more servers, and/or other computing devices). Moreover, while operations of the method 500 are shown in a particular order, this is not meant to be limiting. One or more operations may be reordered, omitted, and/or added.

At block 552, the system obtains one or more 1P interpretations of a spoken utterance that is directed to an automated assistant. The one or more 1P interpretations of the spoken utterance can be determined by the automated assistant in the same or similar manner described with respect to the operations of block 352-356 of the method 300 of FIG. 3, and transmitted to the system to obtain the one or more 1P interpretations. At block 554, the system obtains one or more 3P interpretations of the spoken utterance that is directed to the automated assistant. The one or more 3P interpretations of the spoken utterance can be determined by one or more 3P agents in the same or similar manner described with respect to the operations of block 360-364 of the method 300 of FIG. 3, and transmitted to the system to obtain the one or more 3P interpretations assuming that the automated assistant determines to identify one or more 3P agents.

At block 556, the system selects a given interpretation of the spoken utterance from among the one or more 1P interpretations and the one or more 3P interpretations. The system can select the given interpretation of the spoken utterance from among the one or more 1P interpretations and the one or more 3P interpretations in the same or similar manner described with respect to the operations of block 366 of FIG. 3. However, in the method 500 of FIG. 5, and in contrast with the method 300 of FIG. 3 and the method 400 of FIG. 4, the system may correspond to one or more independent 3P agents. Put another way, the one or more 1P interpretations and the one or more 3P interpretations can be joined for selecting of the given interpretation by the one or more independent 3P agents in a manner that prevents the automated assistant from obtaining any 3P agent data (or 3P interpretations that are determined based on the 3P agent data) from the one or more 3P agents, and that also prevents the one or more 3P agents from obtaining any 1P agent data (or 1P interpretations that are determined based on the 1P agent data). Moreover, by selecting the given interpretation of the spoken utterance in this manner, latency can be reduced in the process of selecting the given interpretations and subsequently causing a given 3P agent to satisfy the spoken utterance based on the given interpretation.

At block 558, the system determines whether to transmit the given interpretation to the automated assistant or a given 3P agent. The system can determine whether to transmit the given interpretation of the spoken utterance to the automated assistant or the given 3P agent based on one or more predicted latency measures associated with transmitting the given interpretation of the spoken utterance to the automated assistant. For example, if the system determines that the human-to-computer dialog will be unnecessarily prolonged based on the one or more predicted latency measures associated with transmitting the given interpretation of the spoken utterance to the automated assistant, then the system may transmit the given interpretation directly to the given 3P agent. However, if the system determines that the one or more predicted latency measures associated with transmitting the given interpretation of the spoken utterance to the automated assistant are negligible, then the system may transmit the given interpretation to the automated assistant. Even in implementations where the system transmits the given interpretation directly to the given 3P agent, the system can still transmit the given interpretation of the spoken utterance to the automated assistant for generating of one or more training instances as described above with respect to the method 400 of FIG. 3 to leverage the selection for training of the ML model, while ensuring that latency in the human-to-computer dialog session is reduced.

If, at an iteration of block 558, the system determines to transmit the given interpretation to the automated assistant, then the system may proceed to block 560. At block 560, the system transmits the given interpretation of the spoken utterance to the automated assistant to cause the automated assistant to cause the given 3P agent to satisfy the spoken utterance based on the given interpretation of the spoken utterance. For example, the given 3P agent may be executed locally at a client device on which the automated assistant is executed at least in part. In this example, the one or more predicted latency measures associated with transmitting the given interpretation of the spoken utterance to the automated assistant may be negligible since the automated assistant can easily provide the given interpretation to the given 3P agent (e.g., via an application programming interface (API)).

If, at an iteration of block 558, the system determines to transmit the given interpretation to the given 3P agent, then the system may proceed to block 562. At block 562, the system transmits the given interpretation of the spoken utterance to the given 3P agent to cause the given 3P agent to satisfy the spoken utterance based on the given interpretation of the spoken utterance. For example, the given 3P agent may be remotely from a client device (e.g., at remote server(s)) on which the automated assistant is executed at least in part. In this example, the one or more predicted latency measures associated with transmitting the given interpretation of the spoken utterance to the automated assistant may not be negligible since the automated assistant introduces an unnecessary networking hop and also increasing a likelihood that data associated with the given interpretation could be lost in the transmitting.

Figure 6:
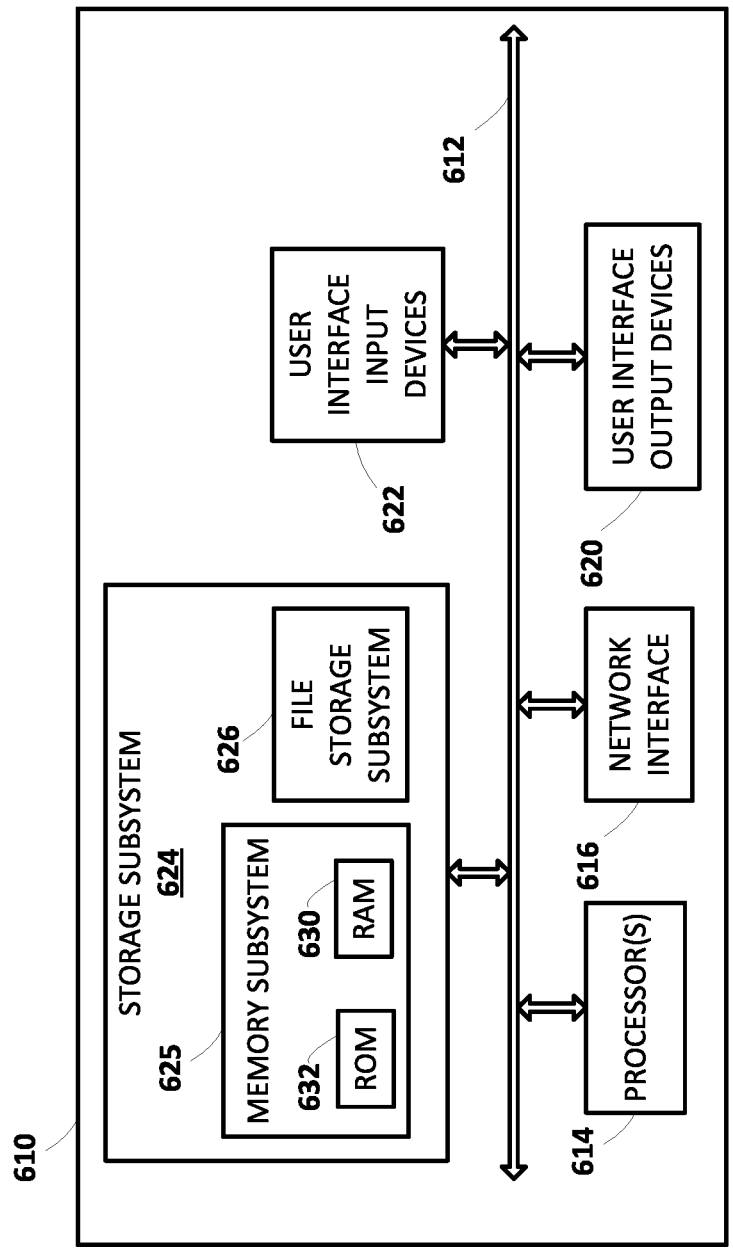
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes processing, using an automatic speech recognition (ASR) model, audio data that captures a spoken utterance of a user to generate ASR output, the audio data being generated by one or more microphones of a client device of the user, and the spoken utterance being directed to an automated assistant executed at least in part at the client device; processing, using a natural language understanding (NLU) model, the ASR output, to generate NLU output; determining, based on the NLU output, a plurality of first-party interpretations of the spoken utterance, each of the plurality of first-party interpretations being associated with a corresponding first-party predicted value indicative of a magnitude of confidence that each of the first-party interpretations are predicted to satisfy the spoken utterance; identifying a given third-party agent capable of satisfying the spoken utterance; transmitting, to the given third-party agent and over one or more networks, and based on the NLU output, one or more structured requests that, when received, causes the given third-party to determine a plurality of third-party interpretations of the spoken utterance, each of the plurality of third-party interpretations being associated with a corresponding third-party predicted value indicative of a magnitude of confidence that each of the third-party interpretations are predicted to satisfy the spoken utterance; receiving, from the given third-party agent and over one or more of the networks, the plurality of third-party interpretations of the spoken utterance; selecting, based on the corresponding first-party predicted values and the corresponding third-party predicted values, a given interpretation of the spoken utterance from among the plurality of first-party interpretations and the plurality third-party interpretations; and causing the given third-party agent to satisfy the spoken utterance based on the given interpretation of the spoken utterance.

These and other implementations of technology disclosed herein can optionally include one or more of the following features.

In some implementations, the corresponding first-party predicted values may indicate a corresponding first-party order as the magnitude of confidence that each of the first-party interpretations are predicted to satisfy the spoken utterance, and the corresponding third-party predicted values may indicate a corresponding third-party order as the magnitude of confidence that each of the third-party interpretations are predicted to satisfy the spoken utterance.

In some versions of those implementation, selecting the given interpretation of the spoken utterance based on the corresponding first-party predicted values and the corresponding third-party predicted values may include applying one or more rules to the corresponding first-party order and the corresponding third-party order to select the given interpretation of the spoken utterance. In some further versions of those implementations, applying the one or more rules to the corresponding first-party order and the corresponding third-party order to select the given interpretation of the spoken utterance may include identifying one or more heuristically-defined rules as the one or more rules based on determining that the corresponding first-party predicted values indicate the corresponding first-party order and the corresponding third-party predicted values indicate the corresponding third-party order; and applying the one or more heuristically-defined rules to the corresponding first-party order and the corresponding third-party order to select the given interpretation of the spoken utterance.

In some versions of those implementations, the corresponding first-party order differs from the corresponding third-party order may be based on one or more user interactions, of the user, with the given third-party agent and without utilization of the automated assistant. In some versions of those implementations, the corresponding first-party order differs from the corresponding third-party order may be based on one or more user interactions, of a group of users that exclude the user of the client device, with the given third-party agent.

In some implementations, the corresponding first-party predicted values may indicate a corresponding first-party score, for each of the first-party interpretations, as the magnitude of confidence that each of the first-party interpretations are predicted to satisfy the spoken utterance, and the corresponding third-party predicted values may indicate a corresponding third-party score, for each of the third-party interpretations, as the magnitude of confidence that each of the third-party interpretations are predicted to satisfy the spoken utterance.

In some versions of those implementations, selecting the given interpretation of the spoken utterance based on the corresponding first-party predicted values and the corresponding third-party predicted values may include applying one or more rules to the corresponding first-party scores and the corresponding third-party scores to select the given interpretation of the spoken utterance. In some further versions of those implementations, applying the one or more rules to the corresponding first-party scores and the corresponding third-party scores to select the given interpretation of the spoken utterance may include comparing the corresponding first-party scores and the corresponding third-party scores to a plurality of score thresholds; and selecting the given interpretation of the spoken utterance based on comparing the corresponding first-party scores and the corresponding third-party scores to the plurality of score thresholds. In yet further versions of those implementations, the method may further include in response to determining that one or more of the corresponding first-party scores satisfy a first score threshold, of the plurality of score thresholds, and in response to determining that none the corresponding third-party scores satisfy a second score threshold, of the plurality of score thresholds: selecting, based on the corresponding first-party scores, one of the first-party interpretations as the given interpretation of the spoken utterance. In even yet further versions of those implementations, the method may further include in response to determining that none of the corresponding first-party scores do not satisfy the first score threshold, and in response to determining that one or more of the corresponding third-party scores satisfy the second score threshold: selecting, based on the corresponding third-party scores, one of the third-party interpretations as the given interpretation of the spoken utterance.

In some versions of those implementations, the corresponding first-party scores differ from the corresponding third-party scores may be based on one or more user interactions, of the user, with the given third-party agent and without utilization of the automated assistant. In some versions of those implementations, the corresponding first-party scores differ from the corresponding third-party scores may be based on one or more user interactions, of a group of users that exclude the user of the client device, with the given third-party agent.

In some implementations, the method may further include determining whether one or more third-party agent criteria identification are satisfied. Identifying the given third-party agent capable of satisfying the spoken utterance may be in response to determining the one or more third-party identification criteria are satisfied. In some versions of those implementations, the one or more third-party identification criteria may include one or more of: one or more ASR measures determined in generating the ASR output, one or more NLU measures determined in generating the NLU output, one or more third-party capability measures indicative of a magnitude of confidence that the given third-party agent can satisfy the spoken utterance, one or more predicted latency measures associated with obtaining the plurality of third-party interpretations of the spoken utterance, or one or more of the corresponding first-party predicted values indicative as the magnitude of confidence that one of the first-party interpretations is predicted to satisfy the spoken utterance.

In some implementations, the method may further include identifying a given additional third-party agent capable of satisfying the spoken utterance; transmitting, to the given additional third-party agent and over one or more of the networks, and based on the NLU output, one or more of the structured requests that, when received, cause the given additional third-party to determine a plurality of additional third-party interpretations of the spoken utterance, each of the plurality of additional third-party interpretations being associated with a corresponding additional third-party predicted value indicative of a magnitude of confidence that each of the additional third-party interpretations are predicted to satisfy the spoken utterance; and receiving, from the given additional third-party agent and over one or more of the networks, the plurality of additional third-party interpretations of the spoken utterance. Selecting the given interpretation of the spoken utterance may be further based on the corresponding additional third-party predicted values, and from among the plurality of first-party interpretations, the plurality of third-party interpretations, and the plurality of additional third-party interpretations.

In some implementations, transmitting the one or more structured requests to the given third-party agent may further cause the given third-party agent to determine whether one or more of the plurality of third-party interpretations of the spoken utterance are determined based on data that is available to the given third-party agent, but that is not available to the automated assistant, and may further cause the given third-party agent to transmit the one or more of the plurality of third-party interpretations of the spoken utterance along with an indication that the one or more of the plurality of third-party interpretations are determined based on the data that is available to the given third-party agent, but that is not available to the automated assistant. In some versions of those implementations, the data that is available to the given third-party agent, but that is not available to the automated assistant, may be based on one or more of: one or more user interactions, of the user, with the given third-party agent and without utilization of the automated assistant, or on one or additional more user interactions, of a group of users that exclude the user of the client device, with the given third-party agent.

In some implementations, each of the plurality of first-party interpretations and each of the plurality of third-party interpretations may include a corresponding intent, one or more corresponding parameters associated with the corresponding intent, and one or more corresponding slot values for each of the one or more corresponding parameters. In some versions of those implementations, each of the plurality of first-party interpretations may include one of: a unique corresponding intent, or one or more unique corresponding slot values for one or more of the corresponding parameters. In some versions of those implementations, each of the plurality of third-party interpretations may include one of: a unique corresponding intent, or one or more unique corresponding slot values for one or more of the corresponding parameters.

In some implementations, the method may further include determining whether the given interpretation is one of the plurality of first-party interpretations or one of the plurality of third-party interpretations; and in response to determining that the given interpretation is one of the plurality of first-party interpretations: causing the automated assistant to provide, for presentation to the user of the client device, an indication that the given interpretation is one of the plurality of first-party interpretations; and in response to determining that the given interpretation is one of the plurality of third-party interpretations: causing the automated assistant to provide, for presentation to the user of the client device, an indication that the given interpretation is one of the plurality of third-party interpretations. In some versions of those implementations, causing the automated assistant to provide, for presentation to the user of the client device, the indication that the given interpretation is one of the plurality of third-party interpretations may include causing the automated assistant to audibly render the indication that the given interpretation is one of the plurality of third-party interpretations in a synthesized voice that is reserved for third-party agents, and that is distinct from an automated assistant voice reserved for the automated assistant.

In some implementations, a method implemented by one or more processors is provided, and includes processing, using an automatic speech recognition (ASR) model, audio data that captures a spoken utterance of a user to generate ASR output, the audio data being generated by one or more microphones of a client device of the user, and the spoken utterance being directed to an automated assistant executed at least in part at the client device; processing, using a natural language understanding (NLU) model, the ASR output, to generate NLU output; determining, based on the NLU output, a plurality of first-party interpretations of the spoken utterance, each of the plurality of first-interpretations being associated with a corresponding first-party predicted value indicative of a magnitude of confidence that each of the first-party interpretations are predicted to satisfy the spoken utterance; identifying a given third-party agent capable of satisfying the spoken utterance; transmitting, to the given third-party agent and over one or more networks, and based on the NLU output, one or more structured requests that, when received, causes the given third-party to determine a plurality of third-party interpretations of the spoken utterance, each of the plurality of third-party interpretations being associated with a corresponding third-party predicted value indicative of a magnitude of confidence that each of the third-party interpretations are predicted to satisfy the spoken utterance; receiving, from the given third-party agent and over one or more of the networks, the plurality of third-party interpretations of the spoken utterance; selecting, based on the corresponding first-party predicted values and the corresponding third-party predicted values, a given interpretation of the spoken utterance from among the plurality of first-party interpretations and the third-party interpretations; and generating one or more training instances to be utilized in updating a machine learning (ML) model that is trained to select given interpretations for spoken utterances based on the plurality of first-party interpretations, the corresponding first-party predicted values, the plurality of third-party interpretations, and the corresponding third-party predicted values.

These and other implementations of technology disclosed herein can optionally include one or more of the following features.

In some implementations, generating the one or more training instances to be utilized in updating the ML model may include labeling the given interpretation of the spoken utterance that was selected with a positive training label; and labeling one or more of the first-party interpretations and one or more of the third-party interpretations that were not selected with a corresponding negative training label.

In some versions of those implementations, the method may further include applying the plurality of first-party interpretations and the plurality of third-party interpretations as input across the ML model to generate predicted output associated with each the plurality of first-party interpretations and the plurality of third-party interpretations; comparing the predicted output associated with each the plurality of first-party interpretations and the plurality of third-party interpretations to the positive training label and the corresponding negative training labels to generate one or more losses; and causing the ML model to be updated based on the one or more losses. In some further versions of those implementations, applying the plurality of first-party interpretations and the plurality of third-party interpretations as input across the ML model may include applying the corresponding first-party predicted values and the corresponding third-party predicted values as input across the ML model to generate the predicted output. In some further versions of those implementations, applying the plurality of first-party interpretations and the plurality of third-party interpretations as input across the ML model further may include applying an indication that data that is available to the given third-party agent, but that is not available to the automated assistant, was utilized in generating the plurality of third-party interpretations as input across the ML model along with the corresponding first-party predicted values and the corresponding third-party predicted values.

In some versions of those implementations, applying the plurality of first-party interpretations and the plurality of third-party interpretations as input across the ML model further may include applying an indication of one or more intents and/or one or more corresponding parameters associated with the one or more intents as input across the ML model along with the corresponding first-party predicted values and the corresponding third-party predicted values. In some further versions of those implementations, the one or more intents may be included in the NLU data, and the indication of the one or more intents may include an indication of the one or more intents are to be resolved in selecting the given interpretations. In some further versions of those implementations, the one or more corresponding parameters may be included in the NLU data, and the indication of the one or more corresponding parameters may include an indication of the one or more corresponding parameters are to be resolved in selecting the given interpretations.

In some versions of those implementations, labeling the given interpretation of the spoken utterance that was selected with a positive training label may include determining whether one or more user satisfaction criteria are satisfied. Labeling the given interpretation of the spoken utterance that was selected with the positive training label may be in response to determining that one or more of the user satisfaction criteria are satisfied.

In some implementations, a method implemented by one or more processors is provided, and includes obtaining a plurality of first-party interpretations of a spoken utterance. Each of the first-party interpretations of the spoken utterance are determined by an automated assistant, and the automated assistant determines the first-party interpretations based on: processing, using an automatic speech recognition (ASR) model, audio data that captures the spoken utterance of a user to generate ASR output, the audio data being generated by one or more microphones of a client device of the user, and the spoken utterance being directed to the automated assistant executed at least in part at the client device; processing, using a natural language understanding (NLU) model, the ASR output, to generate NLU output; and determining, based on the NLU output, the plurality of first-party interpretations of the spoken utterance, each of the plurality of first-party interpretations being associated with a corresponding first-party predicted value indicative of a magnitude of confidence that each of the first-party interpretations are predicted to satisfy the spoken utterance. The method further includes obtaining a plurality of third-party interpretations of the spoken utterance. Each of the third-party interpretations of the spoken utterance are determined by one or more third-party agents, and each of the one or more third-party agents determine one or more of the third-party interpretations based on: receiving, from the automated assistant over one or more networks, and based on the NLU output, one or more structured requests; and determining, based on the one or more structured requests, the plurality of third-party interpretations of the spoken utterance, each of the plurality of third-party interpretations being associated with a corresponding third-party predicted value indicative of a magnitude of confidence that each of the third-party interpretations are predicted to satisfy the spoken utterance. The method further includes selecting, based on the corresponding first-party predicted values and the corresponding third-party predicted values, a given interpretation of the spoken utterance from among the plurality of first-party interpretations and the plurality of third-party interpretations; and transmitting the given interpretation of the spoken utterance to the automated assistant or a given third-party agent, of the one or more third-party agents.

These and other implementations of technology disclosed herein can optionally include one or more of the following features.

In some implementations, transmitting the given interpretation of the spoken utterance to the automated assistant may cause the automated assistant to cause the given third-party agent to satisfy the spoken utterance based on the given interpretation of the spoken utterance.

In some implementations, transmitting the given interpretation of the spoken utterance to the given third-party agent may cause the given third-party agent to satisfy the spoken utterance based on the given interpretation of the spoken utterance.

In some implementations, the one or more processors may be implemented by an independent third-party agent. The independent third-party agent may exclude the automated assistant and the one or more third-party agents utilized in generating the plurality of third-party interpretations.

In some implementations, the method may further include determining whether to transmit the given interpretation of the spoken utterance to the automated assistant or the given third-party agent based on one or more predicted latency measures associated with transmitting the given interpretation of the spoken utterance to the automated assistant; and in response to determining that the one or more predicted latency measures associated with transmitting the given interpretation of the spoken utterance to the automated assistant satisfy a latency threshold: transmitting the given interpretation of the spoken utterance to the given third-party agent. In some versions of those implementations, the method may further include in response to determining that the one or more predicted latency measures associated with transmitting the given interpretation of the spoken utterance to the automated assistant fail to satisfy the latency threshold: transmitting the given interpretation of the spoken utterance to the automated assistant.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
   processing, using an automatic speech recognition (ASR) model, audio data that captures a spoken utterance of a user to generate ASR output, the audio data being generated by one or more microphones of a client device of the user, and the spoken utterance being directed to an automated assistant executed at least in part at the client device;
   processing, using a natural language understanding (NLU) model, the ASR output, to generate NLU output;
   determining, based on the NLU output, a plurality of first-party interpretations of the spoken utterance, each of the plurality of first-party interpretations being associated with a corresponding first-party predicted value indicative of a magnitude of confidence that each of the first-party interpretations are predicted to satisfy the spoken utterance;
   identifying a given third-party agent capable of satisfying the spoken utterance;
   transmitting, to the given third-party agent and over one or more networks, and based on the NLU output, one or more structured requests that, when received, causes the given third-party to determine a plurality of third-party interpretations of the spoken utterance, each of the plurality of third-party interpretations being associated with a corresponding third-party predicted value indicative of a magnitude of confidence that each of the third-party interpretations are predicted to satisfy the spoken utterance;
   receiving, from the given third-party agent and over one or more of the networks, the plurality of third-party interpretations of the spoken utterance;
   selecting, based on the corresponding first-party predicted values and the corresponding third-party predicted values, a given interpretation of the spoken utterance from among the plurality of first-party interpretations and the plurality third-party interpretations; and
   causing the given third-party agent to satisfy the spoken utterance based on the given interpretation of the spoken utterance.

2. The method of claim 1, wherein the corresponding first-party predicted values indicate a corresponding first-party order as the magnitude of confidence that each of the first-party interpretations are predicted to satisfy the spoken utterance, and wherein the corresponding third-party predicted values indicate a corresponding third-party order as the magnitude of confidence that each of the third-party interpretations are predicted to satisfy the spoken utterance.

3. The method of claim 2, wherein selecting the given interpretation of the spoken utterance based on the corresponding first-party predicted values and the corresponding third-party predicted values comprises:
   applying one or more rules to the corresponding first-party order and the corresponding third-party order to select the given interpretation of the spoken utterance.

4. The method of claim 3, wherein applying the one or more rules to the corresponding first-party order and the corresponding third-party order to select the given interpretation of the spoken utterance comprises:
   identifying one or more heuristically-defined rules as the one or more rules based on determining that the corresponding first-party predicted values indicate the corresponding first-party order and the corresponding third-party predicted values indicate the corresponding third-party order; and
   applying the one or more heuristically-defined rules to the corresponding first-party order and the corresponding third-party order to select the given interpretation of the spoken utterance.

5. The method of claim 2, wherein the corresponding first-party order differs from the corresponding third-party order based on one or more user interactions, of the user, with the given third-party agent and without utilization of the automated assistant.

6. The method of claim 2, wherein the corresponding first-party order differs from the corresponding third-party order based on one or more user interactions, of a group of users that exclude the user of the client device, with the given third-party agent.

7. The method of claim 1, wherein the corresponding first-party predicted values indicate a corresponding first-party score, for each of the first-party interpretations, as the magnitude of confidence that each of the first-party interpretations are predicted to satisfy the spoken utterance, and wherein the corresponding third-party predicted values indicate a corresponding third-party score, for each of the third-party interpretations, as the magnitude of confidence that each of the third-party interpretations are predicted to satisfy the spoken utterance.

8. The method of claim 7, wherein selecting the given interpretation of the spoken utterance based on the corresponding first-party predicted values and the corresponding third-party predicted values comprises:
   applying one or more rules to the corresponding first-party scores and the corresponding third-party scores to select the given interpretation of the spoken utterance.

9. The method of claim 8, wherein applying the one or more rules to the corresponding first-party scores and the corresponding third-party scores to select the given interpretation of the spoken utterance comprises:

comparing the corresponding first-party scores and the corresponding third-party scores to a plurality of score thresholds; and selecting the given interpretation of the spoken utterance based on comparing the corresponding first-party scores and the corresponding third-party scores to the plurality of score thresholds.

10. The method of claim 9, further comprising:

in response to determining that one or more of the corresponding first-party scores satisfy a first score threshold, of the plurality of score thresholds, and in response to determining that none the corresponding third-party scores satisfy a second score threshold, of the plurality of score thresholds:

selecting, based on the corresponding first-party scores, one of the first-party interpretations as the given interpretation of the spoken utterance.

11. The method of claim 10, further comprising:

in response to determining that none of the corresponding first-party scores do not satisfy the first score threshold, and in response to determining that one or more of the corresponding third-party scores satisfy the second score threshold:

selecting, based on the corresponding third-party scores, one of the third-party interpretations as the given interpretation of the spoken utterance.

12. The method of claim 7, wherein the corresponding first-party scores differ from the corresponding third-party scores based on one or more user interactions, of the user, with the given third-party agent and without utilization of the automated assistant.

13. The method of claim 7, wherein the corresponding first-party scores differ from the corresponding third-party scores based on one or more user interactions, of a group of users that exclude the user of the client device, with the given third-party agent.

14. The method of claim 1, further comprising:

determining whether one or more third-party agent criteria identification are satisfied; and wherein identifying the given third-party agent capable of satisfying the spoken utterance is in response to determining the one or more third-party identification criteria are satisfied.

15. The method of claim 14, wherein the one or more third-party identification criteria include one or more of: one or more ASR measures determined in generating the ASR output, one or more NLU measures determined in generating the NLU output, one or more third-party capability measures indicative of a magnitude of confidence that the given third-party agent can satisfy the spoken utterance, one or more predicted latency measures associated with obtaining the plurality of third-party interpretations of the spoken utterance, or one or more of the corresponding first-party predicted values indicative as the magnitude of confidence that one of the first-party interpretations is predicted to satisfy the spoken utterance.

16. The method of claim 1, further comprising:

identifying a given additional third-party agent capable of satisfying the spoken utterance;

transmitting, to the given additional third-party agent and over one or more of the networks, and based on the NLU output, one or more of the structured requests that, when received, cause the given additional third-party to determine a plurality of additional third-party interpretations of the spoken utterance, each of the plurality of additional third-party interpretations being associated with a corresponding additional third-party predicted value indicative of a magnitude of confidence that each of the additional third-party interpretations are predicted to satisfy the spoken utterance;

receiving, from the given additional third-party agent and over one or more of the networks, the plurality of additional third-party interpretations of the spoken utterance; and wherein selecting the given interpretation of the spoken utterance is further based on the corresponding additional third-party predicted values, and from among the plurality of first-party interpretations, the plurality of third-party interpretations, and the plurality of additional third-party interpretations.

17. The method of claim 1, wherein transmitting the one or more structured requests to the given third-party agent further causes the given third-party agent to determine whether one or more of the plurality of third-party interpretations of the spoken utterance are determined based on data that is available to the given third-party agent, but that is not available to the automated assistant, and further causes the given third-party agent to transmit the one or more of the plurality of third-party interpretations of the spoken utterance along with an indication that the one or more of the plurality of third-party interpretations are determined based on the data that is available to the given third-party agent, but that is not available to the automated assistant.

18. The method of claim 17, wherein the data that is available to the given third-party agent, but that is not available to the automated assistant, is based on one or more of: one or more user interactions, of the user, with the given third-party agent and without utilization of the automated assistant, or on one or additional more user interactions, of a group of users that exclude the user of the client device, with the given third-party agent.

19. A method implemented by one or more processors, the method comprising:

processing, using an automatic speech recognition (ASR) model, audio data that captures a spoken utterance of a user to generate ASR output, the audio data being generated by one or more microphones of a client device of the user, and the spoken utterance being directed to an automated assistant executed at least in part at the client device;

processing, using a natural language understanding (NLU) model, the ASR output, to generate NLU output;

determining, based on the NLU output, a plurality of first-party interpretations of the spoken utterance, each of the plurality of first-interpretations being associated with a corresponding first-party predicted value indicative of a magnitude of confidence that each of the first-party interpretations are predicted to satisfy the spoken utterance;

identifying a given third-party agent capable of satisfying the spoken utterance;

transmitting, to the given third-party agent and over one or more networks, and based on the NLU output, one or more structured requests that, when received, causes the given third-party to determine a plurality of third-party interpretations of the spoken utterance, each of the plurality of third-party interpretations being associated with a corresponding third-party predicted value indicative of a magnitude of confidence that each of the third-party interpretations are predicted to satisfy the spoken utterance;

receiving, from the given third-party agent and over one or more of the networks, the plurality of third-party interpretations of the spoken utterance;

selecting, based on the corresponding first-party predicted values and the corresponding third-party predicted values, a given interpretation of the spoken utterance from among the plurality of first-party interpretations and the third-party interpretations; and generating one or more training instances to be utilized in updating a machine learning (ML) model that is trained to select given interpretations for spoken utterances based on the plurality of first-party interpretations, the corresponding first-party predicted values, the plurality of third-party interpretations, and the corresponding third-party predicted values.

20. A method implemented by one or more processors, the method comprising:

obtaining a plurality of first-party interpretations of a spoken utterance, wherein each of the first-party interpretations of the spoken utterance are determined by an automated assistant, and wherein the automated assistant determines the first-party interpretations based on:

processing, using an automatic speech recognition (ASR) model, audio data that captures the spoken utterance of a user to generate ASR output, the audio data being generated by one or more microphones of a client device of the user, and the spoken utterance being directed to the automated assistant executed at least in part at the client device;

processing, using a natural language understanding (NLU) model, the ASR output, to generate NLU output; and determining, based on the NLU output, the plurality of first-party interpretations of the spoken utterance, each of the plurality of first-party interpretations being associated with a corresponding first-party predicted value indicative of a magnitude of confidence that each of the first-party interpretations are predicted to satisfy the spoken utterance;

obtaining a plurality of third-party interpretations of the spoken utterance, wherein each of the third-party interpretations of the spoken utterance are determined by one or more third-party agents, and wherein each of the one or more third-party agents determine one or more of the third-party interpretations based on:

receiving, from the automated assistant over one or more networks, and based on the NLU output, one or more structured requests; and determining, based on the one or more structured requests, the plurality of third-party interpretations of the spoken utterance, each of the plurality of third-party interpretations being associated with a corresponding third-party predicted value indicative of a magnitude of confidence that each of the third-party interpretations are predicted to satisfy the spoken utterance;

selecting, based on the corresponding first-party predicted values and the corresponding third-party predicted values, a given interpretation of the spoken utterance from among the plurality of first-party interpretations and the plurality of third-party interpretations; and transmitting the given interpretation of the spoken utterance to the automated assistant or a given third-party agent, of the one or more third-party agents.

* * * * *